United States Patent
Cheon et al.

(10) Patent No.: US 12,517,641 B2
(45) Date of Patent: Jan. 6, 2026

(54) SLIDABLE ELECTRONIC DEVICE AND CONTROL METHOD THEREFOR

(71) Applicant: SAMSUNG ELECTRONICS CO., LTD., Suwon-si (KR)

(72) Inventors: Kawon Cheon, Suwon-si (KR); Yeojun Yoon, Suwon-si (KR); Soojung Lee, Suwon-si (KR); Jooho Seo, Suwon-si (KR); Seungjoon Lee, Suwon-si (KR); Jaehyuk Lee, Suwon-si (KR); Donghun Kim, Suwon-si (KR); Minsoo Kim, Suwon-si (KR); Seonkeun Park, Suwon-si (KR); Jaewoong Chung, Suwon-si (KR); Duyeong Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/680,350

(22) Filed: May 31, 2024

(65) Prior Publication Data

US 2024/0319858 A1    Sep. 26, 2024

Related U.S. Application Data

(63) Continuation of application No. 18/102,407, filed on Jan. 27, 2023, now Pat. No. 12,032,815, which is a
(Continued)

(30) Foreign Application Priority Data

Jul. 29, 2020    (KR) .......................... 10-2020-0094770

(51) Int. Cl.
*G06F 3/0484*    (2022.01)
*G06F 1/16*    (2006.01)
(Continued)

(52) U.S. Cl.
CPC ........ *G06F 3/04845* (2013.01); *G06F 1/1624* (2013.01); *G06F 1/1652* (2013.01); *G06F 3/0488* (2013.01)

(58) Field of Classification Search
CPC .. G06F 3/04845; G06F 3/0488; G06F 1/1624; G06F 1/1652
See application file for complete search history.

(56) References Cited

U.S. PATENT DOCUMENTS

2013/0234951 A1    9/2013    Kim et al.
2013/0252668 A1    9/2013    Cheng et al.
(Continued)

FOREIGN PATENT DOCUMENTS

JP        2019218758 A    12/2019
KR    1020140065551 A     5/2014
(Continued)

OTHER PUBLICATIONS

Communication dated Sep. 23, 2024, issued by the Korean Intellectual Property Office in Korean Patent Application No. 10-2020-0094770.
(Continued)

*Primary Examiner* — Lisa S Landis
(74) *Attorney, Agent, or Firm* — Sughrue Mion, PLLC

(57) ABSTRACT

An electronic device includes a housing; a flexible display at least partially exposed to an outside through the housing; and at least one processor operatively connected to the flexible display, wherein the at least one processor is configured to: based on receiving a first user input on the flexible display for a sliding operation to expose a second part including at least part of a first part of the flexible display to the outside in a state in which the first part of the flexible display is exposed to the outside, identify an edge area of the flexible display to be slid, control the flexible
(Continued)

display to display an indicator in at least part of an area of the first part of the flexible display corresponding to the edge area of the flexible display, and expose the second part to the outside by sliding at least part of the flexible display including the edge area after the indicator is displayed.

20 Claims, 22 Drawing Sheets

Related U.S. Application Data continuation of application No. PCT/KR2021/008263, filed on Jun. 30, 2021.

(51) Int. Cl.
*G06F 3/04845* (2022.01)
*G06F 3/0488* (2022.01)

(56) References Cited

U.S. PATENT DOCUMENTS

| | | | |
|---|---|---|---|
| 2014/0187227 A1 | 7/2014 | Song | |
| 2014/0204037 A1 | 7/2014 | Kim | |
| 2014/0340299 A1* | 11/2014 | Lee | G06F 3/147 345/156 |
| 2015/0355728 A1 | 12/2015 | Cho et al. | |
| 2016/0187122 A1 | 6/2016 | Krimon et al. | |
| 2016/0357221 A1 | 12/2016 | Huh | |
| 2016/0378270 A1 | 12/2016 | Lee et al. | |
| 2017/0011714 A1 | 1/2017 | Eim et al. | |
| 2018/0329514 A1 | 11/2018 | Kwon et al. | |
| 2019/0317559 A1 | 10/2019 | Lin et al. | |
| 2020/0209923 A1 | 7/2020 | Ahn | |
| 2021/0034210 A1 | 2/2021 | Chung et al. | |

FOREIGN PATENT DOCUMENTS

| | | |
|---|---|---|
| KR | 1020140095347 A | 8/2014 |
| KR | 1020140135404 A | 11/2014 |
| KR | 1020150140971 A | 12/2015 |
| KR | 1020160150533 A | 12/2016 |
| KR | 10-2017-0005557 A | 1/2017 |
| KR | 1020170089831 A | 8/2017 |
| KR | 10-2017-0099866 A | 9/2017 |
| KR | 1020190098340 A | 8/2019 |
| KR | 10-2020-0084480 A | 7/2020 |

OTHER PUBLICATIONS

International Search Report (ISA/210) issued Sep. 17, 2021 by the International Searching Authority in International Application No. PCT/KR2021/008263.

Written Opinion (ISA/237) issued Sep. 14, 2021 by the International Searching Authority in International Application No. PCT/KR2021/008263.

Communication issued on Dec. 7, 2023 by the European Patent Office in European Patent Application No. 21849460.7.

Communication issued Jun. 5, 2025 by the European Patent Office in European Patent Application No. 25161056.4.

* cited by examiner

SLIDABLE ELECTRONIC DEVICE AND CONTROL METHOD THEREFOR

CROSS-REFERENCE TO RELATED APPLICATIONS

This is a Continuation Application of U.S. application Ser. No. 18/102,407, filed on Jan. 27, 2023, which is a bypass continuation application of International Application No. PCT/KR2021/008263, filed on Jun. 30, 2021, which is based on and claims priority to Korean Patent Application No. 10-2020-0094770, filed on Jul. 29, 2020, in the Korean Intellectual Property Office, the disclosures of which are incorporated by reference herein in their entireties.

BACKGROUND

1. Field

The disclosure relate to a slidable electronic device and a method of controlling the same.

2. Description of Related Art

The number of services and additional functions provided through electronic devices, for example, a portable electronic device such as a smartphone has increased. Communication service providers or electronic device manufacturers have competitively provided various functions to increase the utilization of electronic devices and satisfy the needs of various users and developed electronic devices to differentiate them from other companies. Accordingly, the functions provided through the electronic devices are also increasingly advanced.

SUMMARY

Provided are an electronic device that displays various types of content such as application icons and/or widgets on a screen through a display, and a control method thereof.

In an electronic device including a flexible display, the size of a display area may be changed along with a switching of the screen to an open state or a closed state, due to movement and/or transformation of, for example, a structure included in the electronic device.

An electronic device can be manufactured in a form without a bezel and physical buttons. As a microphone and a speaker can be designed to be disposed inside the electronic device, rather than on the outer surface of the electronic device, the electronic device may be manufactured such that a user does not need to make distinction between the directions of the electronic device.

Accordingly, the user may have difficulty in predicting a sliding area and a sliding direction of the display in the process of sliding the electronic device, which is highly likely to incur a sliding malfunction due to gripping of the electronic device.

Various embodiments of the disclosure provide a slidable electronic device and a method of controlling the same, which provide information about an area and a direction in which sliding is to be performed to a user and reduces sliding malfunctions.

The technical objects to be achieved in the disclosure are not limited to what has been described above, and other unmentioned technical objects may be clearly understood by those skilled in the art from the following description.

According to an aspect of the disclosure, an electronic device includes: a housing; a flexible display at least partially exposed to an outside through the housing; and at least one processor operatively connected to the flexible display, wherein the at least one processor is configured to: based on receiving a first user input on the flexible display for a sliding operation to expose a second part including at least part of a first part of the flexible display to the outside in a state in which the first part of the flexible display is exposed to the outside, identify an edge area of the flexible display to be slid, control the flexible display to display an indicator in at least part of an area of the first part of the flexible display corresponding to the edge area of the flexible display, and expose the second part to the outside by sliding at least part of the flexible display including the edge area after the indicator is displayed.

The at least one processor may be further configured to: control the flexible display to display a guide object for receiving a second user input related to a sliding direction of the edge area, together with the indicator, and based on receiving the second user input through the guide object, expose the second part to the outside by sliding the at least part of the flexible display including the edge area according to the sliding direction.

The guide object may include a first object related to a first sliding length of the flexible display, and a second object related to a second sliding length of the flexible display, the second sliding length being greater than the first sliding length, and the at least one processor may be further configured to slide the at least part of the flexible display based on a sliding length related to an object selected by the second user input from among the first object and the second object.

The at least one processor may be further configured to: based on identification of the edge area, detect an interference factor interfering with a sliding operation of the edge area, based on a detection of the interference factor, provide a first feedback indicating that the interference factor exists, and based on detection of removal of the interference factor after the first feedback is provided, expose the second part to the outside by sliding the at least part of the flexible display including the edge area.

The at least one processor may be further configured to, based on the first feedback including at least one of vibration, sound, lighting, or message display, identify that the interference factor exists.

The at least one processor may be further configured to, based on the removal of the interference factor not being detected for a predetermined time after the first feedback is provided, provide a second feedback with a greater intensity than the first feedback.

The first feedback may be set by a user input.

The at least one processor may be further configured to, based on detection of at least one of a touch input or a pressure greater than or equal to a predetermined value in at least part of the edge area, determine that the interference factor is detected.

The at least one processor may be further configured to, based on receiving the first user input, identify the edge area with respect to a basic display direction of a UI screen of the electronic device.

The at least one processor may be further configured to: control the flexible display to display an area of first content, corresponding to the first part through the first part in the state in which the first part of the flexible display is exposed to the outside, based on receiving the first user input, compare the basic display direction of the UI screen with a direction of the first content, and control the flexible display to display an area of second content, corresponding to the second part based on a result of the comparison in a state in which the second part is exposed by sliding of the at least part of the flexible display.

According to an aspect of the disclosure, a method of controlling an electronic device, includes: based on receiving a first user input on a flexible display of the electronic device for a sliding operation to expose a second part including at least part of a first part of the flexible display to the outside in a state in which the first part of the flexible display is exposed to the outside, identifying an edge area of the flexible display to be slid; displaying an indicator in at least part of an area of the first part of the flexible display corresponding to the edge area of the flexible display; and exposing the second part to the outside by sliding at least part of the flexible display including the edge area after the indicator is displayed.

The method may further include displaying a guide object for receiving a second user input related to a sliding direction of the edge area, together with the indicator, and the exposing the second part to the outside may include, based on receiving the second user input through the guide object, exposes the second part to the outside by sliding the at least part of the flexible display including the edge area according to the sliding direction.

The guide object may include a first object related to a first sliding length of the flexible display, and a second object related to a second sliding length of the flexible display, the second sliding length being greater than the first sliding length, and the exposing the second part to the outside may include sliding the at least part of the flexible display based on a sliding length related to an object selected by the second user input from among the first object and the second object.

The method may further include: based on identification of the edge area, detecting an interference factor interfering with a sliding operation of the edge area; and based on detection of the interference factor, providing a first feedback indicating that the interference factor exists, and the exposing the second part to the outside may include, based on detection of removal of the interference factor after the first feedback is provided, exposing the second part to the outside by sliding the at least part of the flexible display including the edge area.

The method may further include, based on the first feedback including at least one of vibration, sound, lighting, or message display, identifying that the interference factor exists.

The method may further include, based on the removal of the interference factor not being detected during a predetermined time after the first feedback is provided, providing a second feedback with a greater intensity than the first feedback.

The first feedback may be set by a user input.

The detecting the interference factor may include, based on detection of at least one of a touch input or a pressure greater than or equal to a predetermined value in at least part of the edge area, determining that the interference factor is detected.

The identifying the edge area of the flexible display to be slid may include, based on receiving the first user input, identifying the edge area with respect to a basic display direction of a UI screen of the electronic device.

The method may further include: displaying an area of first content, corresponding to the first part through the first part in the state in which the first part of the flexible display is exposed to the outside; based on receiving the first user input, comparing the basic display direction of the UI screen with a direction of the first content; and displaying an area of second content, corresponding to the second part based on a result of the comparison in a state in which the second part is exposed by sliding of the at least part of the flexible display.

According to one more embodiments of the disclosure, an electronic device may reduce sliding malfunctions by providing information about an area and a direction in which sliding is to be performed and a feedback related to a factor that interferes with a sliding operation to a user. Accordingly, the electronic device may provide an improved user experience to the user.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
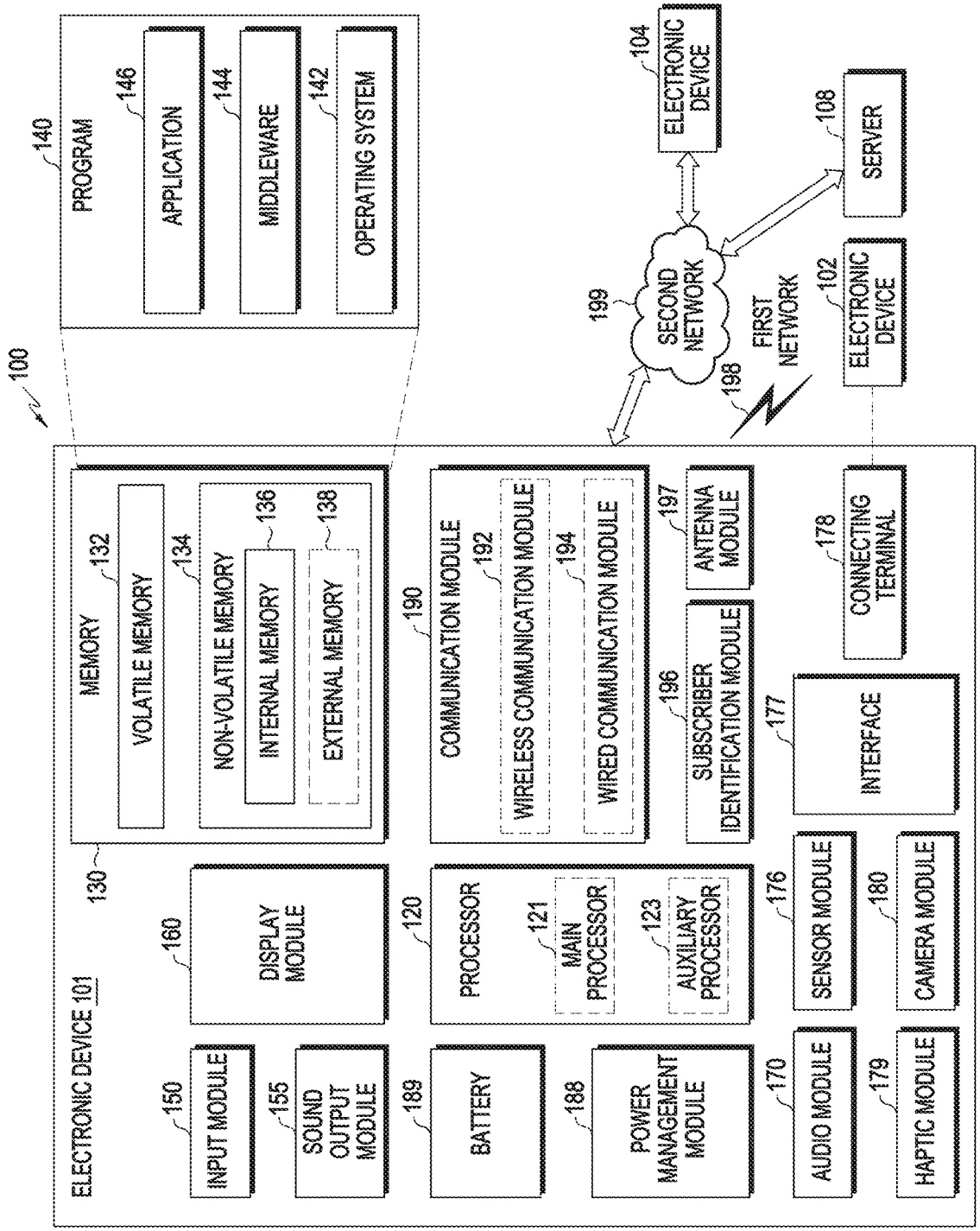
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include IoT device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
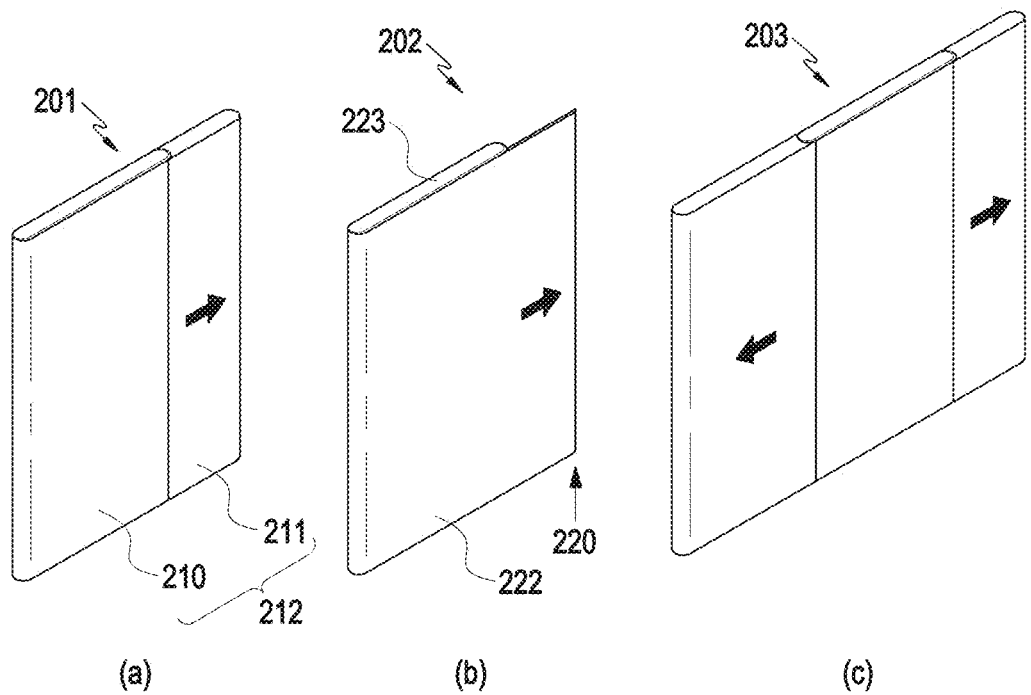
FIG. 2 is a diagram illustrating the types of slidable electronic devices according to various embodiments.
Figure 2:
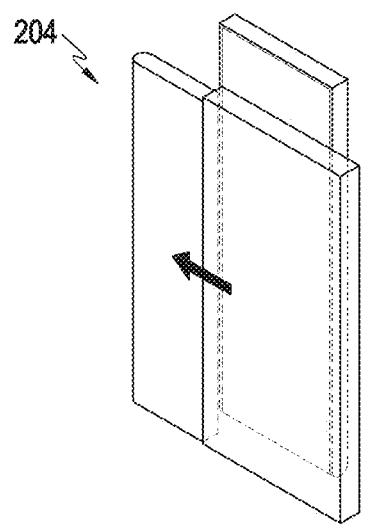

FIG. 2 is a diagram illustrating the types of slidable electronic devices according to various embodiments. According to various embodiments, an electronic device 201, 202, 203 or 204 of FIG. 2 (e.g., the electronic device 101 of FIG. 1) may include a housing, a display (e.g., the display module 160 of FIG. 1), and at least one processor (e.g., the processor 120 of FIG. 1) operatively connected to the display.

According to various embodiments, at least part of the display may be exposed to the outside through the housing. According to various embodiments, the display may include one or more displays. According to various embodiments, the display may include an unfolded display (e.g., a flat display or an edge display) which is not bendable, or a flexible display (e.g., a foldable display, a rollable display, or a stretchable display). Although the display is described as a flexible display hereinbelow, the disclosure is not limited thereto, and an unfold display may also be applied.

According to various embodiments, the at least one processor capable of performing and controlling the functions of the electronic device 201, 202, 203 or 204, and memory (e.g., the memory 130 of FIG. 1) may be disposed inside the housing.

According to various embodiments, a state in which the flexible display has a smallest exposed area may be referred to as a 'closed state', and a state in which the flexible display has a largest exposed area may be referred to as an 'open state'.

According to various embodiments, referring to FIG. 2(a), at least part of the flexible display may slide into or out of the housing. For example, when the slidable electronic device 201 receives a slide-out command in the closed state, part of the flexible display located inside the housing may slide out from the housing, and the slidable electronic device 201 may be placed in the open state. For example, an exposed part 210 of the flexible display in the closed state of the electronic device 201 may be referred to as a first part, and an exposed part of the flexible display in the open state of the electronic device 201 may be referred to as a second part. For example, a second part 212 may be an area covering the first part and an extended area 211 of the flexible display according to the slide-out operation. For example, the flexible display disposed in the housing of the flexible display may be in a fixed state.

According to various embodiments, when the slidable electronic device 201 receives a slide-in command in the open state, a part of the flexible display located outside the housing may slide into the housing, and the slidable electronic device 201 may be placed in the closed state. For example, the exposed part 212 of the flexible display in the open state of the electronic device 201 may be referred to as a first part, and the exposed part 210 of the flexible display in the closed state of the electronic device 201 may be referred to as a second part. For example, the exposed part 210 of the flexible display after the part 211 of the flexible display enters the housing according to the slide-in operation in the first part may be the second part.

According to various embodiments, referring to FIG. 2(b), the flexible display may be disposed to cover the front surface, one side surface, and at least part of the rear surface of the electronic device 202.

For example, upon receipt of a slide-out command in the closed state, the slidable electronic device 202 may move the flexible display such that an edge part 220 of the flexible display disposed on the front surface of the electronic device 202 in an outward direction from the housing of the electronic device 202. For example, the electronic device 202 may drive a roller for moving the flexible display. As the flexible display moves, part of the flexible display disposed on the rear surface 223 of the electronic device 202 may move onto the front surface of the electronic device 202, thereby extending an exposed part 222 of the flexible display. For example, the flexible display disposed on the housing of the flexible display is movable. According to various embodiments, a state in which the exposed part 222 of the flexible display is largest may be referred to as the open state.

According to various embodiments, upon receipt of a slide-in command in the open state, the slidable electronic device 202 may drive the roller such that the edge part 220 of the flexible display disposed on the front surface of the electronic device 202 moves toward the housing from an area outside the housing. As part of the flexible display disposed on the front surface of the electronic device 202 moves to the rear surface 223 of the electronic device 202 according to the driving of the roller, the exposed part of the flexible display may be reduced. A state in which the exposed part of the flexible display is smallest may be referred to as the closed state.

According to various embodiments, the flexible display of the slidable electronic device 202 may be disposed to enter the housing of the electronic device 202 in an area surrounding one side of the electronic device 202, rather than to the rear surface of the electronic device 202.

Figure 3A:
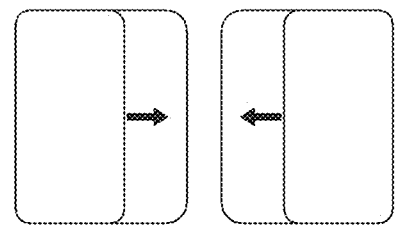
FIG. 3A is a diagram illustrating sliding operations flexible displays in electronic devices according to various embodiments.
Figure 3B:
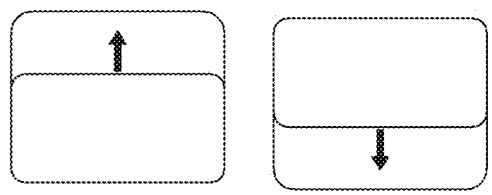
FIG. 3B is a diagram illustrating sliding operations flexible displays in electronic devices according to various embodiments.

Although the flexible displays are shown as extending to the right of the electronic devices 201 and 202 in FIGS. 2(a) and 2(b), the disclosure is not limited thereto. For example, as illustrated in FIG. 3A, the flexible displays may be extended or contracted to the right or left of the electronic devices 201 and 202. In another embodiment, as illustrated in FIG. 3B, when the electronic devices 201 and 202 are horizontally disposed, the flexible displays may be extended or contracted upward or downward from the electronic devices 201 and 202.

In FIGS. 2(a) and 2(b), long sides of the flexible displays of the rectangular electronic devices 201 and 202 are shown as moving to extend or contract the flexible displays, which should not be construed as limiting. For example, as illustrated in FIG. 3C, short sides of the flexible displays of the rectangular electronic devices 201 and 202 may move to extend or contract the flexible displays.

Figure 3C:
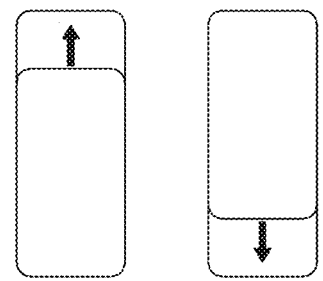
FIG. 3C is a diagram illustrating sliding operations flexible displays in electronic devices according to various embodiments.

Although the rectangular electronic devices 201 and 202 are disposed vertically (e.g., in a portrait mode) and their short sides move upward or downward to extend or contract the flexible displays in FIG. 3C, the disclosure is not limited thereto. For example, the rectangular electronic devices 201 and 202 may be disposed horizontally (e.g., in a landscape mode), and their short sides may move to the left or right to extend or contract the flexible displays.

Figure 3D:
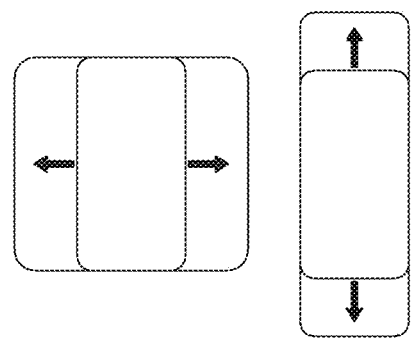
FIG. 3D is a diagram illustrating sliding operations flexible displays in electronic devices according to various embodiments.

Although each of the electronic devices 201 and 202 is shown as shaped into a rectangle in FIGS. 2(a) and 2(b), the disclosure is not limited thereto. For example, as illustrated in FIG. 3D, the electronic devices 201 and 202 may be square. For example, the electronic devices 201 and 202 may extend or contract the flexible display by moving one sides of the flexible displays upward, downward, to the right, or to the left.

Although the flexible displays are shown as extended or contracted in only one direction of the electronic devices 201 and 202 in FIGS. 2(a) and 2(b), the disclosure is not limited thereto. For example, referring to FIG. 2(c), the slidable electronic device 203 may extend or contract the flexible display in both directions.

According to various embodiments, the electronic device 203 may extend or contract the flexible display in only one of the two directions or in both directions.

Although both long sides of the flexible display of the rectangular electronic device 203 are shown as moving in both directions (e.g., left and right) to extend or contract the flexible display in FIG. 2(c), the disclosure is not limited thereto. For example, as illustrated in FIG. 3E, both short sides of the flexible display of the rectangular electronic device 203 may move in both directions (e.g., upward and downward) to extend or contract the flexible display.

Figure 3E:
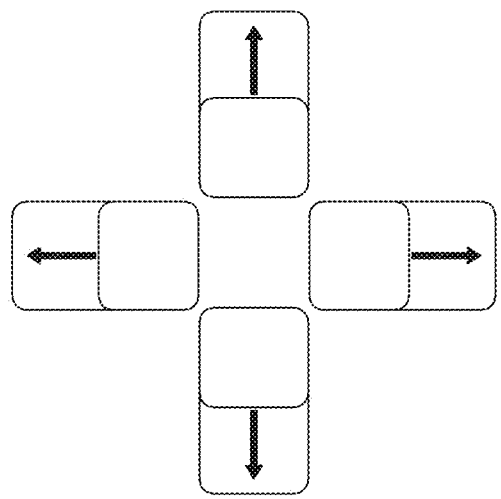
FIG. 3E is a diagram illustrating sliding operations flexible displays in electronic devices according to various embodiments.

Although the rectangular electronic device 203 is shown as vertically disposed in FIGS. 2(c) and 3E, obviously it may be disposed horizontally. According to various embodiments, the electronic device 203 may be square.

Although the flexible display is shown as extended or contracted from both sides in FIG. 2(c), the disclosure is not limited thereto. For example, referring to FIG. 2(d), the slidable electronic device 204 may extend or contract the flexible display in two directions (e.g., one of left and right and one of upward and downward) rather than in both side directions.

Figure 3F:
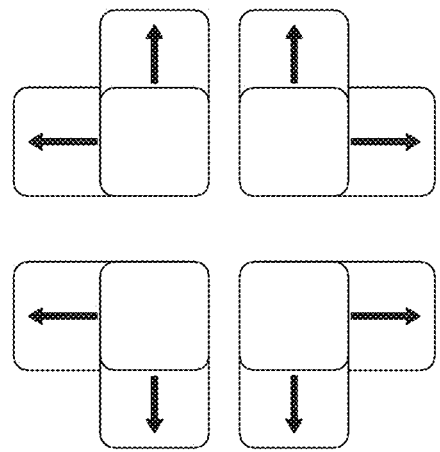
FIG. 3F is a diagram illustrating sliding operations flexible displays in electronic devices according to various embodiments.

For example, referring to FIG. 3F, the electronic device 204 slidable in two directions may extend or contract the flexible display in the left and upward directions, the left and downward directions, the right and upward directions, or the right and downward directions.

According to various embodiments, the slidable electronic device 204 may extend or contract the flexible display through a sliding operation of part of the flexible display disposed inside the housing in two directions. In another embodiment, the electronic device 204 may extend or contract the flexible display in one direction by sliding the part of the flexible display disposed inside the housing as illustrated in FIG. 2(a), whereas the electronic device 204 may extend or contract the flexible display in the other direction by moving the flexible display to the front surface or rear surface of the electronic device 204 in a state where the flexible display covers the front surface, one side surface, and at least part of the rear surface of the electronic device 204.

Although the flexible display is shown as extended or contracted in two directions in FIGS. 2(d) and 3F, the disclosure is not limited thereto, and the flexible display may be extended or contracted in three or four directions.

Figure 4:
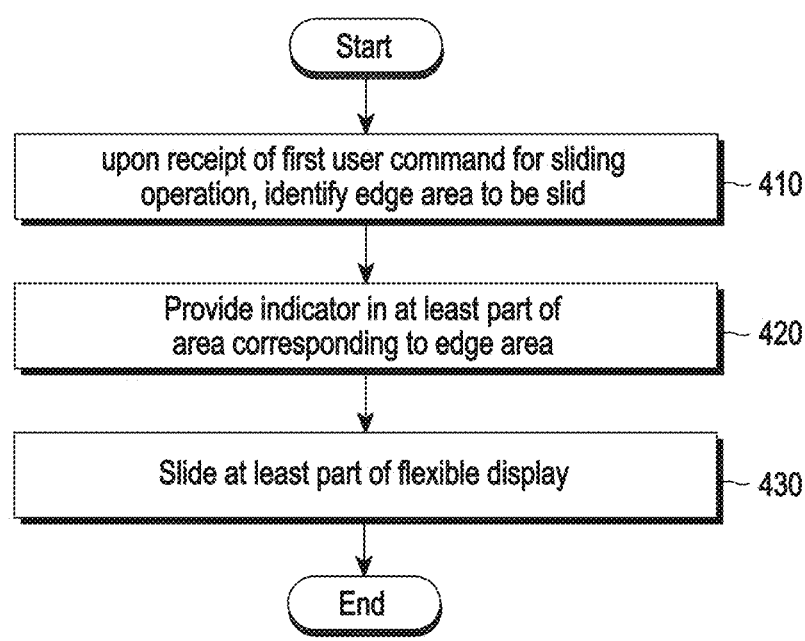
FIG. 4 is a flowchart illustrating an operation of providing an indicator indicating an edge area of a flexible display that slides according to a user input in an electronic device according to various embodiments.

FIG. 4 is a flowchart illustrating an operation of providing an indicator indicating an edge area of a flexible display that slides according to a user input in an electronic device according to various embodiments.

According to various embodiments, upon receipt of a first user input for a sliding operation, the electronic device (e.g., the electronic device 101 or the processor 120 of FIG. 1) may identify an edge area of the flexible display (e.g., the display module 160 of FIG. 1) to be slid in operation 410. According to various embodiments, the edge area may refer to an end area of the flexible display, which is moved for slide-out or slide-in of the flexible display. According to another embodiment, the edge area may refer to an area corresponding to a side surface of the electronic device or an area corresponding to part of the electronic device, in which the flexible display comes out from the inside of the electronic device (or enters the inside of the electronic device from the outside).

For example, upon receipt of a first user input for a sliding operation to expose a second part including at least part of the first part of the flexible display to the outside in a state in which the first part of the flexible display is exposed to the outside, the electronic device may identify an edge area of the flexible display, which is to be slid.

According to various embodiments, the first user input for the sliding operation of the flexible display may an input of a command for slide-out to increase the size of the exposed area of the flexible display or for slide-in to decrease the size of the exposed area of the flexible display. Various embodiments of the first user input will be described below with reference to FIG. 6.

According to various embodiments, upon receipt of the first user input, the electronic device may control a component (e.g., at least one of a roller, a roller driver, an actuator, or a sliding driver) for changing the size of the exposed area of the flexible display, by an electrical signal, so that the size of the exposed area of the flexible display is changed without a user's physical input (e.g., pulling or pushing the flexible display).

According to various embodiments, when the flexible display slides out, the exposed second part of the flexible display may include the first part. An embodiment in which the flexible display slides out will be described below with reference to FIG. 5A.

According to various embodiments, when the flexible display slides in, the exposed second part of the flexible display may be part of the first part. An embodiment in which the flexible display slides in will be described below with reference to FIG. 5B.

According to various embodiments, upon receipt of the first user input, the electronic device may identify the edge area based on a basic display direction of a user interface (UI) screen of the electronic device. According to various embodiments, the edge area may refer to an end area of the flexible display, which is moved for slide-out or slide-in of the flexible display. According to another embodiment, the edge area may refer to an area corresponding to a side surface of the electronic device or an area corresponding to part of the electronic device, in which the flexible display comes out from the inside of the electronic device (or enters the inside of the electronic device from the outside).

According to various embodiments, the basic display direction of the UI screen of the electronic device may be set, when the electronic device is manufactured. For example, the edge area of the flexible display to be slid may be determined at a time of designing the electronic device. When the electronic device is manufactured, the edge area of the flexible display to be slid may be set based on the basic display direction of the UI screen. Accordingly, even if the electronic device does not detect a direction of the electronic device using a sensor (e.g., a gyro sensor), upon receipt of the first user input for a sliding operation, the electronic device may identify the edge area of the flexible display to be slid. For example, in the case where a right edge area of the flexible display slides based on the basic display direction of the UI screen of the electronic device, upon receipt of the first user input, the electronic device may identify that the right edge of the flexible display is to be slid irrespective of a content display direction.

According to various embodiments, upon receipt of the first user input for the sliding operation, the electronic device may compare the basic display direction of the UI screen of the electronic device with the display direction of content being displayed, and identify the edge area of the flexible displays to be slid based on a comparison result. For example, the electronic device may identify the edge area to be slid according to a coordinate system based on an external environment (e.g., a user or content display direction) of the electronic device. For example, in the case where the right edge area of the flexible display slides based on the basic display direction of the UI screen of the electronic device, when the basic display direction of the UI screen of the electronic device and the content display direction are different from each other by 180 degrees (or reversed to each other), upon receipt of the first user input, the electronic device may identify that a left edge area of the flexible display is to slid based on the content display direction. The operation of comparing the basic display direction of the UI screen of the electronic device with the content display direction will be described below with reference to FIGS. 8A to 8D.

According to various embodiments, the electronic device may display an indicator on at least part of an area of the first part corresponding to the edge area in operation 420. For example, the indicator may be used to inform of the sliding edge area of the flexible display. For example, when the electronic device is the electronic device 201, 203, or 204 illustrated in FIG. 2(*a*), FIG. 2(*c*) or FIG. 2(*d*), the area in which the indicator is displayed may be different from the sliding edge area. In another embodiment, when the electronic device is the electronic device 202 illustrated in FIG. 2(*b*), the area in which the indicator is displayed and the sliding edge area may partially overlap with each other.

Figure 7A:
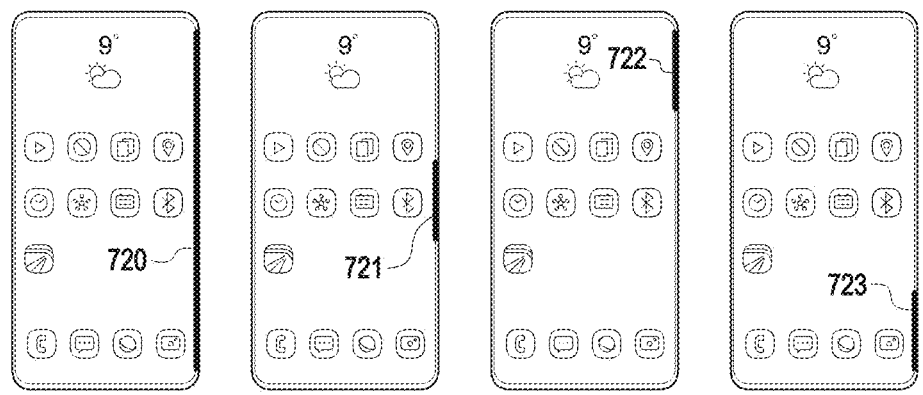
FIG. 7A is a diagram illustrating indicators in an electronic device according to various embodiments.

According to various embodiments, the electronic device may display an object that is a point, a line, or a surface as the indicator in the at least part of the area of the first part corresponding to the edge area to be slid. For example, referring to FIG. 7A, the electronic device 101 (e.g., the electronic device 101 or the processor 120 of FIG. 1) may display a dot-shaped indicator 710, 711, 712, or 713 in the at least part of the area of the first part of the flexible display corresponding to the edge area to be slid. According to various embodiments, the dotted indicators 710, 711, 712, and 713 may have different sizes or different shapes (e.g., circle, semicircle, triangle, or square).

Figure 7B:
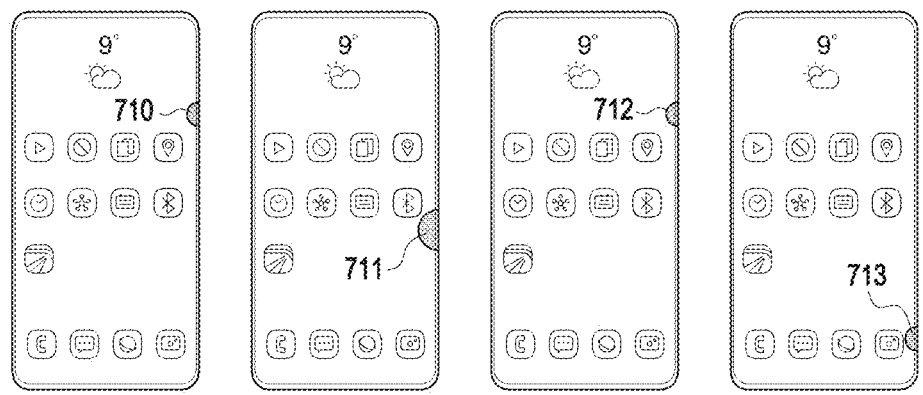
FIG. 7B is a diagram illustrating indicators in an electronic device according to various embodiments.

In another embodiment, referring to FIG. 7B, the electronic device 101 (e.g., the electronic device 101 or the processor 120 of FIG. 1) may display a line-shaped indicator 720, 721, 722, or 723 in the at least part of the area of the first part of the flexible area corresponding to the edge area to be slid.

Figure 7C:
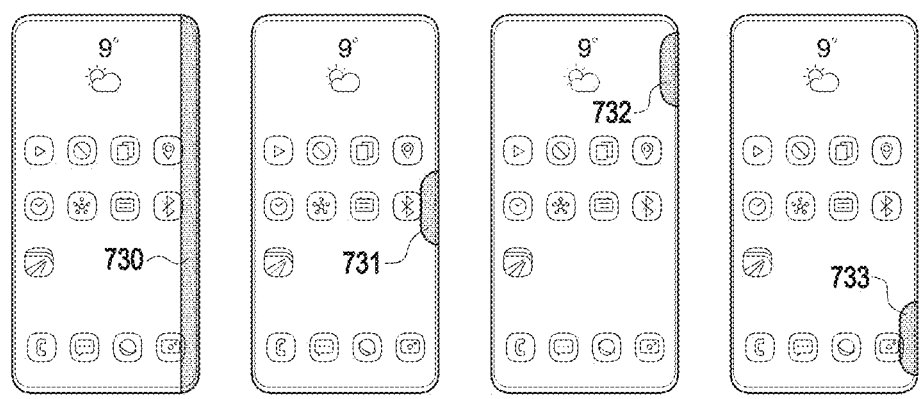
FIG. 7C is a diagram illustrating indicators in an electronic device according to various embodiments.

In another embodiment, referring to FIG. 7C, the electronic device 101 (e.g., the electronic device 101 or the processor 120 of FIG. 1) may display a surface-shaped indicator 730, 731, 732, or 733 in the at least part of the area of the first part of the flexile display corresponding to the edge area to be slid.

According to various embodiments, the electronic device 101 may also display the indicator in an area other than the edge area. For example, the electronic device 101 may display an object for indicating a sliding direction of the flexible display in any area of the flexible display, and the shape and/display position of the object is not limited.

According to various embodiments, the electronic device may display the indicator during at least part of a time period from a time after the reception of the first user input to a time before completion of the sliding operation of the flexible display.

According to various embodiments, the electronic device may provide at least one of an object, sound, lighting, and vibration as the indicator. For example, the electronic device may output at least one of a sound such as "sliding to the right (left, up, or down)", lighting in at least part of the edge area to be slid, or vibration as the indicator.

According to various embodiments, the electronic device may provide a guide object for receiving a second user input related to the sliding direction of the edge area together with the indicator. For example, the guide object may be an object for inducing the user's drag input in the sliding direction of the edge area.

According to various embodiments, the guide object may include a first object related to a first sliding length of the flexible display and a second object related to a second sliding length of the flexible display longer than the first sliding length. Stepwise sliding operations will be described below with reference to FIGS. 12 to 14.

According to various embodiments, upon detection of a factor that interferes with the sliding operation of the edge area, the electronic device may provide a feedback indicating that there is an interference factor. For example, the feedback may include at least one of vibration, voice, a graphical element, sound, lighting, or message display.

According to various embodiments, the electronic device may provide the feedback indicating that there is an interference factor together with or after providing the indicator. In another embodiment, when the guide object is provided, the feedback indicating that there is an interference factor may be provided after the second user input is received through the guide object. Operations of detecting a factor that interferes with a sliding operation will be described below with reference to FIGS. 9 to 11.

According to various embodiments, the electronic device may slide at least part of the flexible display to expose the second part to the outside in operation 430. For example, after the indicator is displayed, the electronic device may slide at least part of the flexible display including the edge area to expose the second part to the outside. The sliding operation of the flexible display has been described before with reference to FIGS. 2 and 3, and a redundant description will be avoided.

According to various embodiments, upon receipt of the second user input through the guide object in the state in which the guide object related to the sliding direction is provided, the electronic device may slide the at least part of the flexible display including the identified edge area in the sliding direction to expose the second part to the outside.

According to various embodiments, when the guide object includes a plurality of objects for a stepwise sliding operation, the electronic device may perform a sliding operation of the flexible display based on a sliding length related to an object selected by the second user input among the plurality of objects.

According to various embodiments, in the case where the feedback indicating that there is the factor interfering with the sliding operation is provided, upon detection of removal of the interference factor, the electronic device may perform the sliding operation of the flexible display. According to various embodiments, when failing to detect the removal of the interference factor during a preset time after the feedback is provided, the electronic device may provide a second feedback with a greater intensity than the provided feedback.

According to various embodiments, the electronic device may display content based on the size of the exposed part of the flexible display, which has been changed by the sliding operation. For example, with the first part of the flexible display exposed to the outside, the electronic device may display an area of the content, corresponding to the first part in the first part. In another embodiment, with the second part exposed by sliding of the at least part of the flexible display, the electronic device may display an area of second content, corresponding to the second part in the second part.

According to various embodiments, the second content and the first content may be the same or different. For example, when the second content is the same as the first content, the electronic device may display a screen displayed in the first part before the start of the sliding operation by extending or contracting the screen based on the size of the second part or by changing the layout of the screen, after the sliding operation. In another embodiment, when a function is mapped to the first user input or the second user input, the second content displayed after the sliding operation may be different from the first content displayed before the start of the sliding operation.

According to various embodiments, the electronic device may display the area of the second content corresponding to the second part in the second part based on a comparison result between the basic display direction of the UI screen of the electronic device and a display direction of the first content. For example, in the case of an electronic device in which a right edge area of a flexible display slides based on the basic display direction of a UI screen of the electronic device, when the display direction of the first content is +90 degrees different from the basic display direction of the UI screen, the electronic device may determine that a lower edge area of the flexible display with respect to the user slides. According to various embodiments, the electronic device may display an area corresponding to the second part including an area lower than the area of the first content corresponding to the first part in the second part of the flexible display.

Figure 5A:
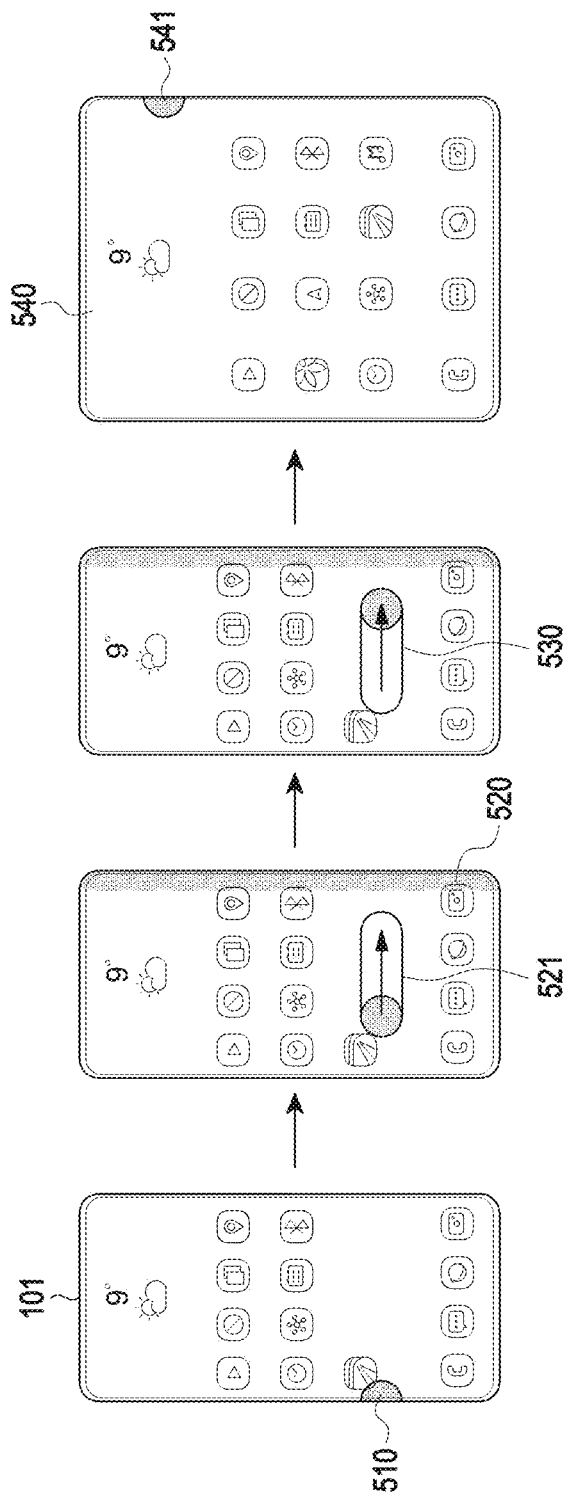
FIG. 5A is a diagram illustrating an operation of providing an indicator and a guide user interface (UI) in an electronic device according to various embodiments.
Figure 5B:
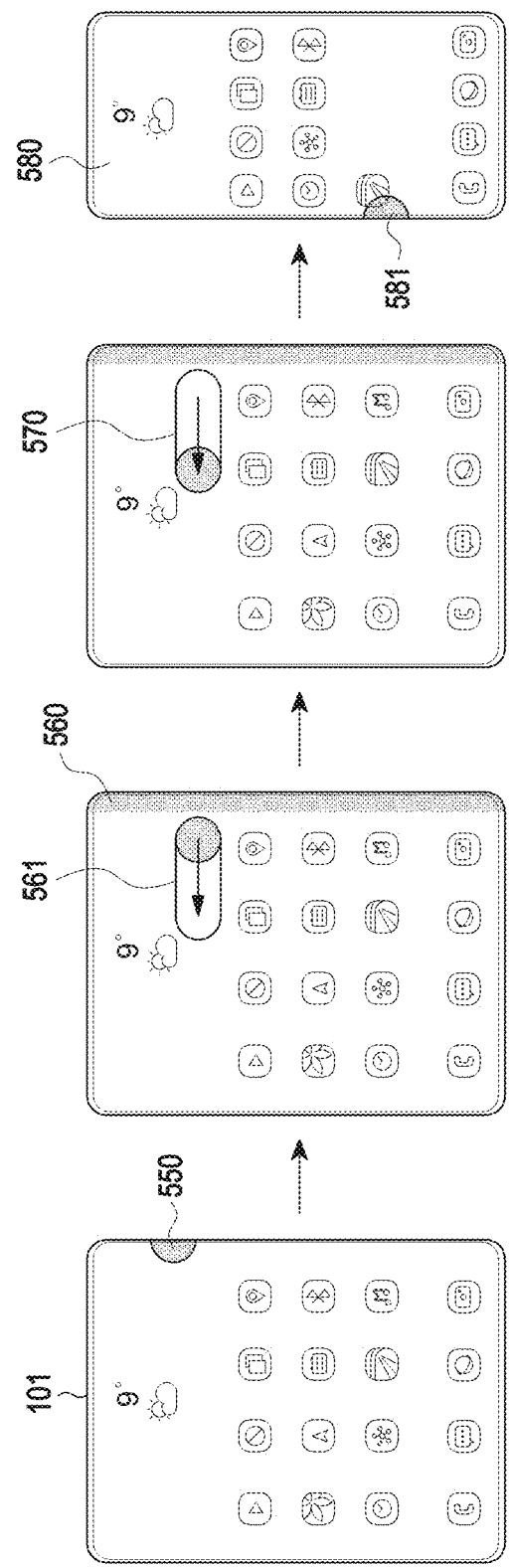
FIG. 5B is a diagram illustrating an operation of providing an indicator and a guide UI in an electronic device according to various embodiments.

FIGS. 5A and 5B are diagrams illustrating operations of providing an indicator and a guide object in an electronic device according to various embodiments. For example, FIG. 5A illustrates slide-out of a flexible display, and FIG. 5B illustrates slide-in of the flexible display.

According to various embodiments, referring to FIG. 5A, upon receipt of a first user input 510 for a sliding operation of the flexible display in a state in which a first part of the flexible display (e.g., the display module 160 of FIG. 1) is exposed (e.g., the closed state), the electronic device 101 (e.g., the electronic device 101 or the processor 120 of FIG. 1) may identify an edge area of the flexible display to be slid, and provide an indicator 520 in at least part of an area of the first part corresponding to the edge area to be slid. For example, the first user input 510 may include a long press touch in a partial area of the edge area of the flexible display.

According to various embodiments, the first user input 510 for the sliding operation of the flexible display is not limited to the long pressing touch in the partial area of the edge area of the flexible display, and various embodiments of the first user input 510 will be described below with reference to FIG. 6.

According to various embodiments, the indicator 520 may be an object visually distinguished from a screen displayed on the flexible display, and the shape of the object is not limited. For example, the object may be at least one of a point, a line, or a surface, as illustrated in FIG. 7.

According to various embodiments, the electronic device 101 may further provide a guide object 521 for receiving a second user input related to a sliding direction of the edge area to be slid.

According to various embodiments, while the indicator 520 or the guide object 521 is being displayed, an object (e.g., an icon) displayed on the flexible display may be deactivated, and thus a function related to the object (e.g., icon) may not be performed even by a touch on the object (e.g., icon).

According to various embodiments, upon receipt of a second user input 530 through the guide object 521, the electronic device 101 may expose a second part 540 of the flexible display by sliding the flexible display. For example, the guide object 521 may be an object for inducing a drag input from left to right. For example, upon receipt the second user input 530 which is a drag input applied from left to right through the guide object 521, the electronic device 101 may slide the right edge area of the flexible display to the right to expose the second part 540 extended from the first part of the flexible display.

According to various embodiments, upon receipt of the first user input 510 or the second user input 530, the electronic device 101 may detect a factor that interferes with the sliding operation. For example, when the guide object 521 is not displayed, upon receipt of the first user input 510, the electronic device may detect the factor that interferes with the sliding operation, whereas when the guide object 521 is displayed, upon receipt of the second user input 530, the electronic device may detect the factor that interferes with the sliding operation.

According to various embodiments, upon detection of the factor interfering with the sliding operation, the electronic device 101 may provide a feedback indicating that there is an interference factor. When the interference factor is removed, the electronic device 101 may perform the sliding operation. In another embodiment, when the factor that interferes with the sliding operation is not detected, the electronic device 101 may perform the sliding operation.

According to various embodiments, with the second part 540 of the flexible display exposed according to the sliding operation, the electronic device 101 may display an object 541 for receiving a user input for slide-in of the flexible display.

According to various embodiments, although the electronic device 101 is shown as displaying a home screen in FIG. 5A, the disclosure is not limited thereto, and the first user input 510 may be received in a state in which an application execution screen or a lock screen is displayed.

For example, upon receipt the first user input 510 in a state in which the lock screen is displayed, the electronic device 101 may display the indicator 520 and the guide object 521 for the second user input. Upon receipt of the second user input 530 through the guide object 521, the electronic device may display an unlocked home screen in the second part 540 of the flexible display exposed according to the sliding operation. According to various embodiments, when user authentication is required for unlocking, the electronic device 101 may perform the user authentication based on a fingerprint input during application of the first user input 510. Alternatively, upon receipt of the first user input 510, the electronic device 101 may unlock the screen by performing user authentication such as face recognition or iris recognition.

According to various embodiments, referring again to FIG. 5B, upon receipt of a first user input 550 for a sliding operation of the flexible display in a state in which a first part of the flexible display (e.g., the display module 160 of FIG. 1) is exposed (e.g., the open state), the electronic device 101 (e.g., the electronic device 101 or the processor 120 of FIG. 1) may identify an edge area of the flexible display to be slid, and provide an indicator 560 in at least part of an area of the first part corresponding to the edge area to be slid. For example, the first user input 550 may include a long press touch in a partial area of the edge area of the flexible display.

According to various embodiments, the first user input 550 for the sliding operation of the flexible display is not limited to the long pressing touch in the partial area of the edge area of the flexible display, and various embodiments of the first user input 550 will be described below with reference to FIG. 6.

According to various embodiments, the indicator 560 may be an object visually distinguished from a screen displayed on the flexible display, and the shape of the object is not limited. For example, the object may be at least one of a point, a line, or a surface, as illustrated in FIG. 7. According to various embodiments, the indicator 560 of FIG. 5B may be distinguished from the indicator 520 of FIG. 5A (e.g., in terms of color).

According to various embodiments, the electronic device 101 may further provide a guide object 561 for receiving a second user input related to a sliding direction of the edge area to be slid.

According to various embodiments, while the indicator 560 or the guide object 561 is being displayed, an object (e.g., icon) displayed on the flexible display may be deactivated, and thus a function related to the object (e.g., icon) may not be performed even by a touch on the object (e.g., icon).

According to various embodiments, upon receipt of a second user input 570 through the guide object 561, the electronic device 101 may expose a second part 580 of the flexible display by sliding the flexible display. For example, the guide object 561 may be an object for inducing a drag input from right to left. For example, upon receipt the second user input which is a drag input applied from right to left through the guide object 561, the electronic device 101 may slide the right edge area of the flexible display to the left to expose the second part 580 contracted from the first part of the flexible display.

According to various embodiments, upon receipt of the first user input 550 or the second user input 570, the electronic device 101 may detect a factor that interferes with the sliding operation. For example, when the guide object 561 is not displayed, upon receipt of the first user input 550, the electronic device may detect a factor that interferes with the sliding operation, whereas when the guide object 561 is displayed, upon receipt of the second user input 570, the electronic device may detect the factor that interferes with the sliding operation.

According to various embodiments, upon detection of the factor interfering with the sliding operation, the electronic device 101 may provide a feedback indicating that there is an interference factor. When the interference factor is removed, the electronic device 101 may perform the sliding operation. In another embodiment, when the factor that interferes with the sliding operation is not detected, the electronic device 101 may perform the sliding operation.

According to various embodiments, with the second part 580 of the flexible display exposed according to the sliding operation, the electronic device 101 may display an object 581 for receiving a user input for slide-out of the flexible display.

Figure 6:
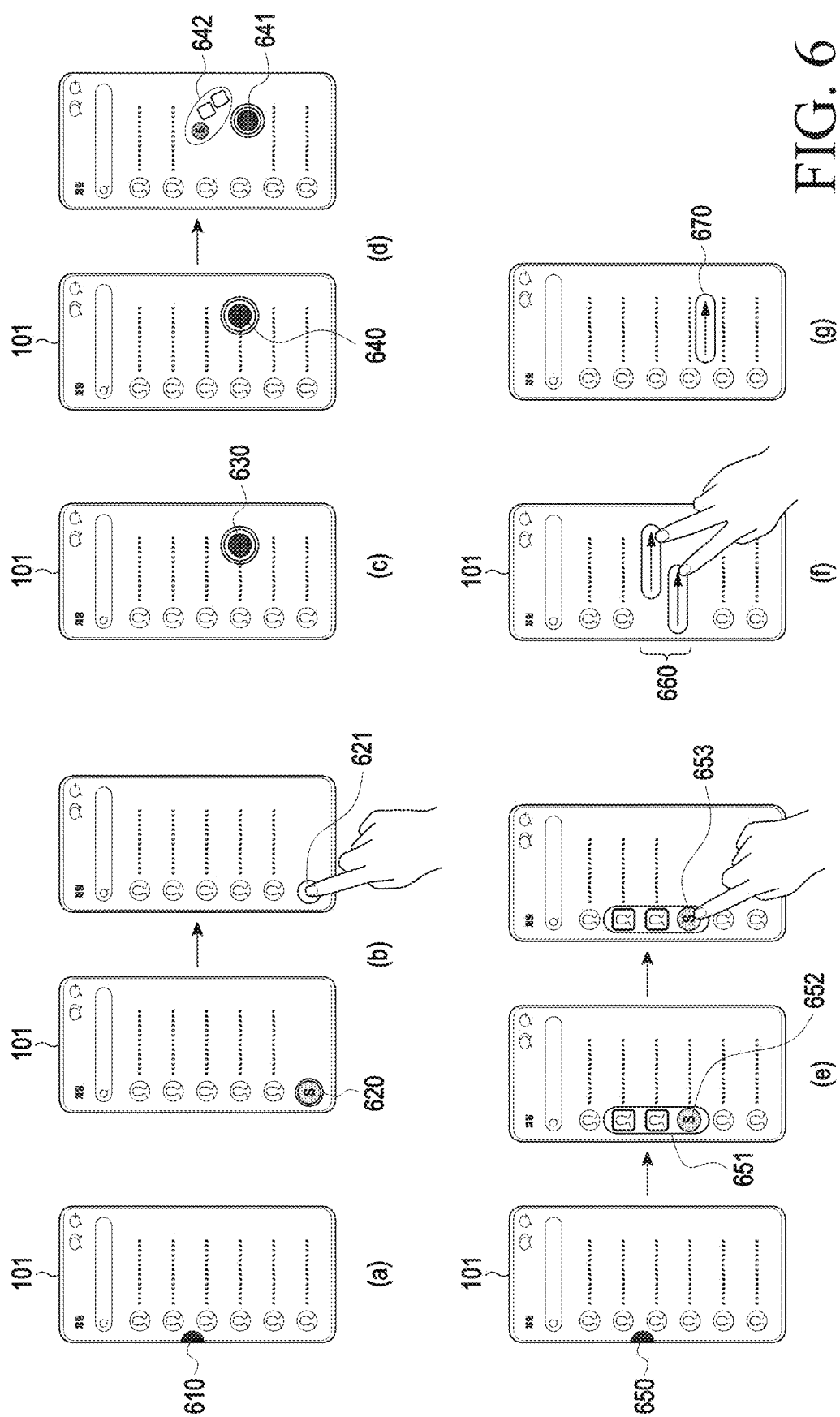
FIG. 6 is a diagram illustrating user inputs for a sliding operation of an electronic device according to various embodiments.

FIG. 6 is a diagram illustrating user inputs for a sliding operation of an electronic device according to various embodiments.

According to various embodiments, referring to FIG. 6(a), upon receipt of a long press touch input 610 in a partial area of an edge area of the flexible display (e.g., the display module 160 of FIG. 1), the electronic device 101 (e.g., the electronic device 101 or the processor 120 of FIG. 1) may identify that a user input for a sliding operation has been received. According to various embodiments, upon receipt of a user input of applying a long press touch in a partial area of the edge area of the flexible display and then dragging (or swiping) the long press touch in one direction, the electronic device 101 may identify that the user input for the sliding operation has been received.

According to various embodiments, referring to FIG. 6(b), upon receipt of a touch input 621 on a UI 620 for a sliding operation, which is always displayed on the flexible display, the electronic device 101 may identify that the user input for the sliding operation has been received.

According to various embodiments, referring to FIG. 6(c), upon receipt of a pressure touch 630 greater than or equal to a preset value on the flexible display, the electronic device 101 may identify that the user input for the sliding operation has been received. For example, the electronic device 101 may sense a pressure touch input to the flexible display using a pressure sensor. According to various embodiments, when a pressure touch is input to an entire exposed area or a predetermined partial area of the flexible display, the electronic device 101 may identify that the user input for the sliding operation has been received.

According to various embodiments, referring to FIG. 6(d), upon receipt of a long press touch 640 on the flexible display, the electronic device 101 may display a UI 641 including at least one icon. According to various embodiments, the UI 641 including the at least one icon may include an icon corresponding to a function frequently used by the user or a function set by the user, and an icon 642 for sliding of the flexible display. According to various embodiments, upon receipt of a touch input for selecting the icon 642 for sliding of the flexible display on the UI 641 including the at least one icon, the electronic device 101 may identify that the user input for the sliding operation has been received.

According to various embodiments, referring to FIG. 6(e), the electronic device 101 may display an object 650 related to at least one function of the electronic device 101 in an edge area of the flexible display. According to various embodiments, upon receipt of a user input for selecting the object 650, the electronic device 101 may display a UI 651 including at least one icon corresponding to at least one function. For example, the user input for selecting the object 650 may be an action of touching the object 650 or an action of touch the object 650 and then dragging (or swiping) the touch. According to various embodiments, the UI 651 including the at least one icon may include an icon corresponding to a function frequently used by the user or a function set by the user, and an icon 652 for sliding of the flexible display.

According to various embodiments, upon receipt of a touch input 653 for selecting the icon 652 for sliding of the flexible display on the UI 651 including the at least one icon, the electronic device 101 may identify that the user input for the sliding operation has been received.

According to various embodiments, referring to FIG. 6(f), upon receipt of a multi-touch and drag (or swipe) input 660 on the flexible display, the electronic device 101 may identify that the user input for the sliding operation has been received. For example, upon receipt of a 2-area multi-touch and then continuous drag (or swipe) input, the electronic device 101 may identify that the user input for the sliding operation has been received.

According to various embodiments, referring to FIG. 6G, when an input for touching and dragging (or swiping) 670 is received on the flexible display, the electronic device 101 receives a user input for a sliding operation. it can be confirmed that For example, when a continuous drag (or swipe) operation is received after a touch on an area on the flexible display is received, the electronic device 101 may confirm that a user input for a sliding operation has been received.

FIG. 6 illustrates only examples of a user input for a sliding operation of the flexible display, which should not be construed as limiting, and the user input for the sliding operation of the flexible display may be set during manufacture of the electronic device 101 or set by the user.

Figure 8A:
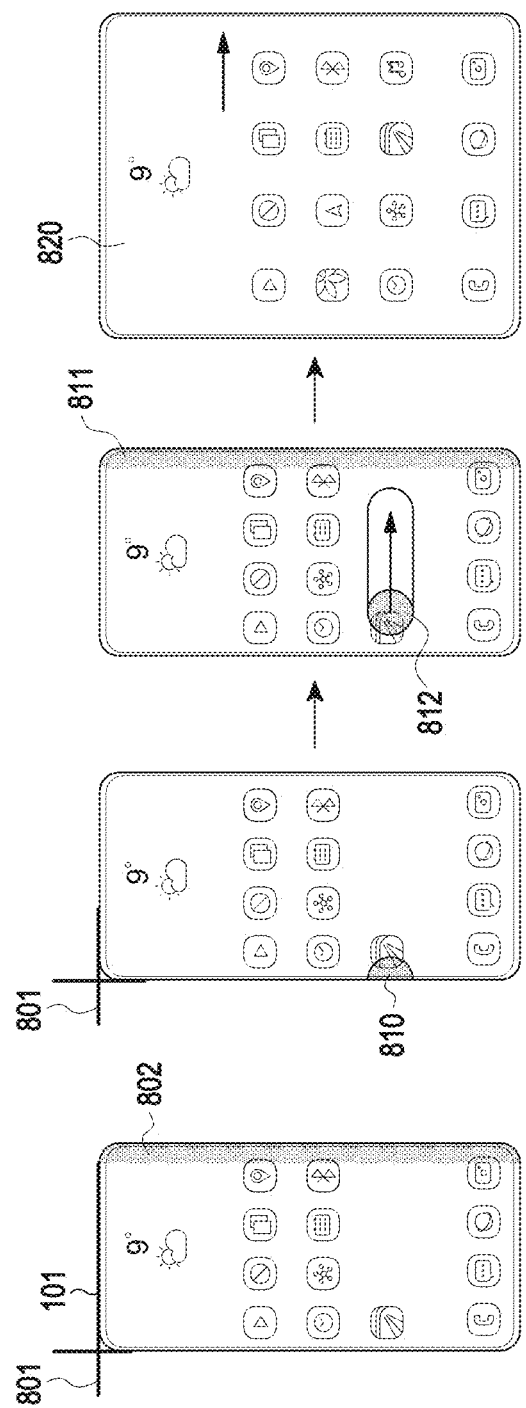
FIG. 8A is a diagram illustrating a direction in which a UI is provided with respect to an electronic device according to various embodiments.
Figure 8B:
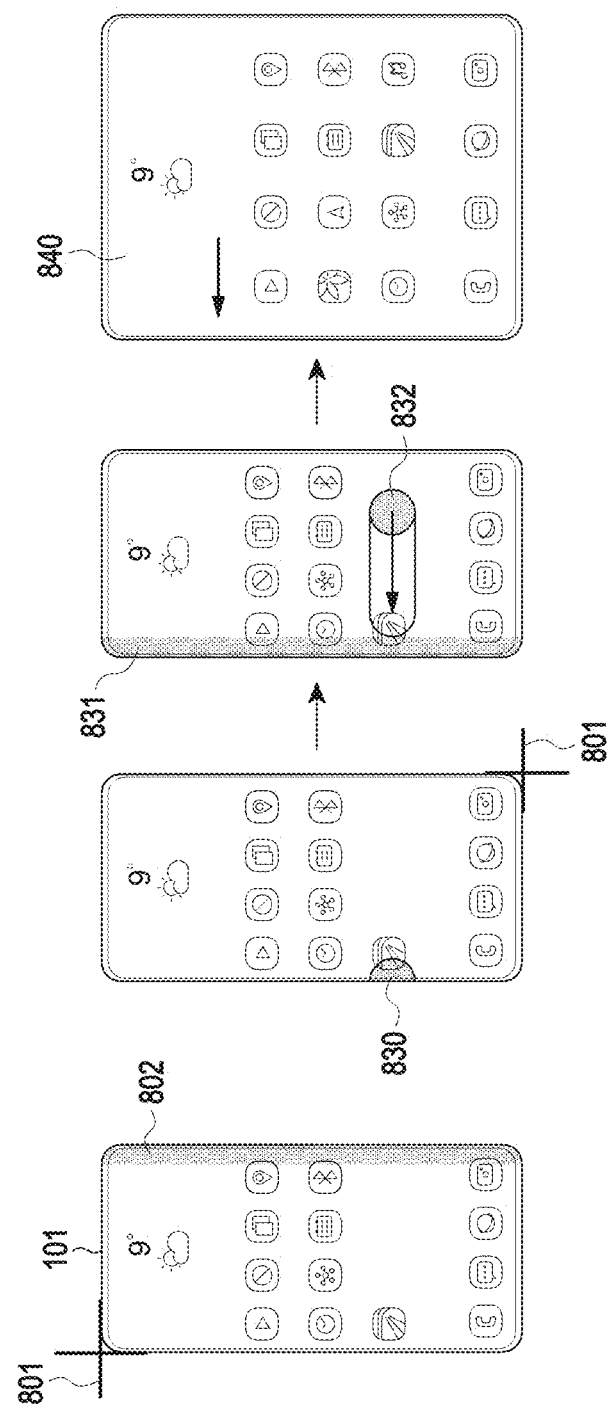
FIG. 8B is a diagram illustrating a direction in which a UI is provided with respect to an electronic device according to various embodiments.
Figure 8C:
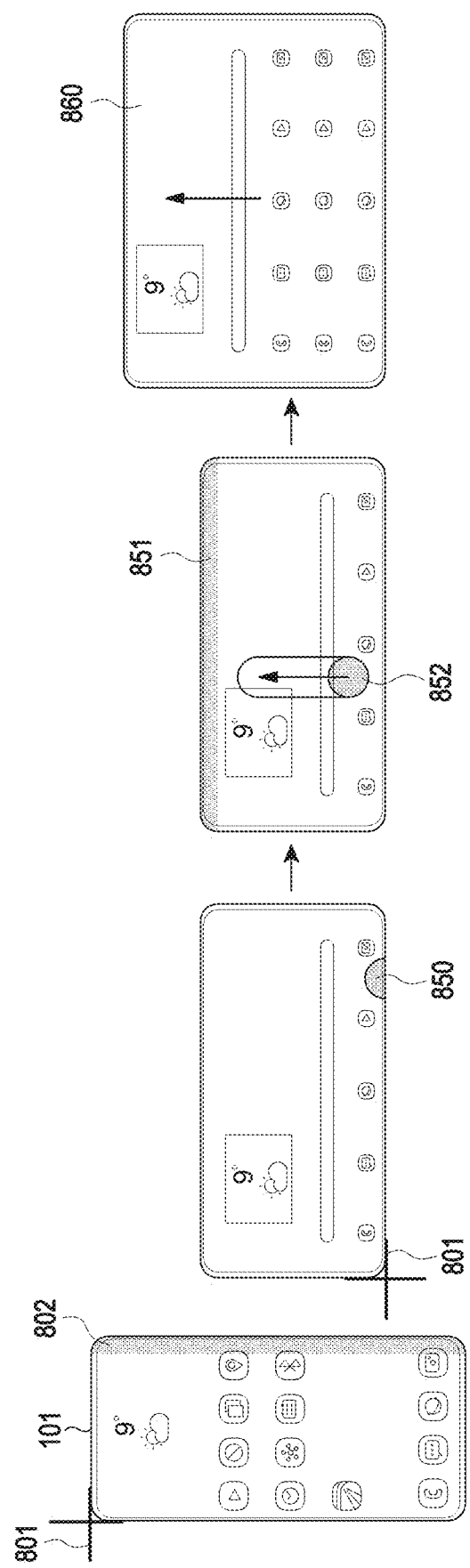
FIG. 8C is a diagram illustrating a direction in which a UI is provided with respect to an electronic device according to various embodiments.
Figure 8D:
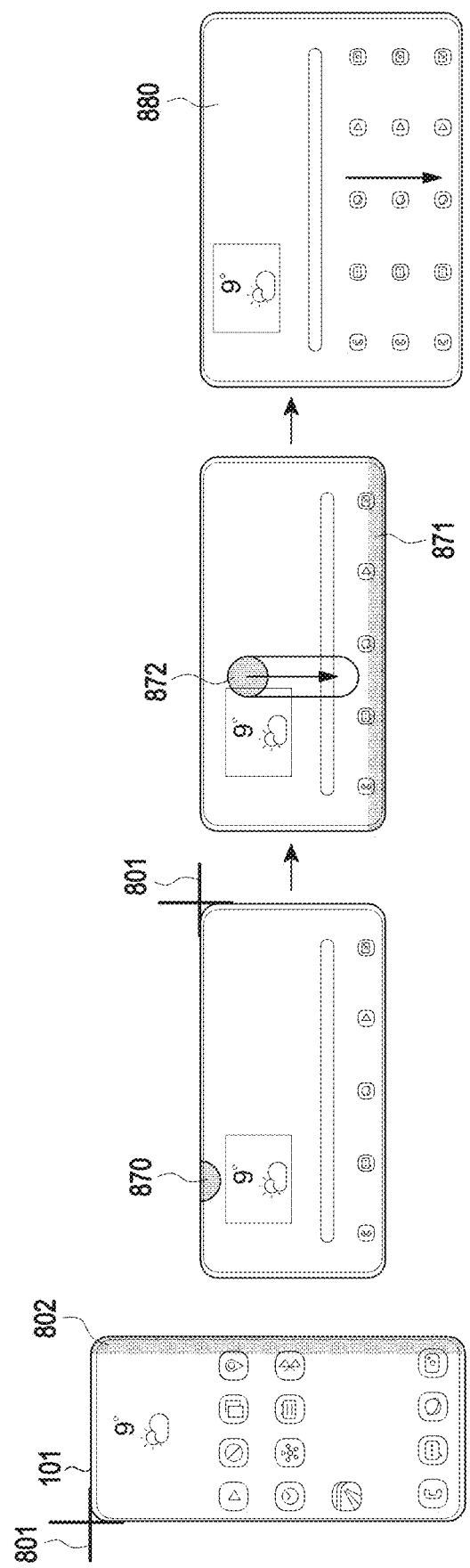
FIG. 8D is a diagram illustrating a direction in which a UI is provided with respect to an electronic device according to various embodiments.

FIG. 8A is a diagram illustrating a content providing direction with respect to an electronic device according to various embodiments. FIG. 8B is a diagram illustrating a content providing direction with respect to an electronic device according to various embodiments. FIG. 8C is a diagram illustrating a content providing direction with respect to an electronic device according to various embodiments. FIG. 8D is a diagram illustrating a content providing direction with respect to an electronic device according to various embodiments. For example, in FIGS. 8A and 8B, a right edge area 802 of the flexible display (e.g., the display module of FIG. 1) may slide based on a basic display direction 801 of a UI interface screen of the electronic device 101 (e.g., the electronic device 101 of FIG. 1). However, the sliding edge area is not limited to the right edge area of the flexible display with respect to the basic display direction 801 of the UI screen of the electronic device 101, and one or more edge areas of the flexible display may be slid.

For example, FIG. 8A illustrates an embodiment in which the basic display direction 801 of the UI screen of the electronic device coincides with a content display direction, FIG. 8B illustrates an embodiment in which the content display direction is reversed to (e.g., 180 degrees different from) the basic display direction 801 of the UI screen of the electronic device, FIG. 8C illustrates an embodiment in which the content display direction is different from the basic display direction 801 of the UI screen of the electronic device by −90 degrees, and FIG. 8D illustrates an embodiment in which the content display direction is different from the basic display direction 801 of the UI screen of the electronic device by +90 degrees. For example, − may indicate a counterclockwise direction, and + may indicate a clockwise direction.

According to various embodiments, referring to FIG. 8A, the basic display direction 801 of the UI screen of the electronic device may coincide with the content display direction. According to various embodiments, upon receipt of a first user input 810 for a sliding operation of the flexible display (e.g., the display module 160 of FIG. 1) in a state in which a first part of the flexible display is exposed (e.g., the closed state), the electronic device 101 (e.g., the electronic device 101 or the processor 120 of FIG. 1) may identify an edge area of the flexible display to be slid, and provide an indicator 811 in at least part of an area of the first part corresponding to the edge area to be slid.

For example, the electronic device 101 may identify a right edge area of the flexible display with respect to the basic display direction 801 of the UI screen as the edge area to be slid or a right edge area of the flexible display with respect to the content display direction as the edge area to be slid, and provide the indicator 811 in at least part of an area of the first part corresponding to the identified edge area.

According to various embodiments, the electronic device 101 may further provide a guide object 812 for receiving a second user input related to a sliding direction of the edge area to be slid. For example, the guide object 812 may induce a second user input that is a drag input from left to right.

According to various embodiments, upon receipt of the second user input through the guide object 812, the electronic device 101 may slide the right edge area of the flexible display to the right to expose an extended second part 820 of the flexible display.

According to various embodiments, when second content displayed in the second part 820 are different from or the same as first content displayed in the first part, an area of the first content corresponding to the second part 820 which further includes a right area compared to an area displayed in the first part may be displayed in the second part 820 of the flexible display.

According to various embodiments, upon receipt of the first user input 810 or the second user input, the electronic device 101 may detect a factor that interferes with the sliding operation. For example, when the guide object 812 is not displayed, upon receipt of the first user input 810, the electronic device may detect the factor that interferes with the sliding operation, and when the guide object 812 is displayed, upon receipt of the second user input, the electronic device may detect the factor that interferes with the sliding operation.

According to various embodiments, upon detection of the factor interfering with the sliding operation, the electronic device 101 may provide a feedback indicating that there is an interference factor. When the interference factor is removed, the electronic device 101 may perform the sliding operation. In another embodiment, when the factor that interferes with the sliding operation is not detected, the electronic device 101 may perform the sliding operation.

According to various embodiments, referring to FIG. 8B, the content display direction may be reversed (e.g., 180 degrees different from) to the basic display direction 801 of the UI screen of the electronic device. According to various embodiments, upon receipt of a first user input 830 for a sliding operation of the flexible display (e.g., the display module 160 of FIG. 1) in a state in which a first part of the flexible display is exposed (e.g., the closed state), the electronic device 101 (e.g., the electronic device 101 or the processor 120 of FIG. 1) may identify an edge area of the flexible display to be slid, and provide an indicator 831 in at least part of an area of the first part corresponding to the edge area to be slid. For example, an upper left part with respect to the basic display direction 801 of the UI screen of the electronic device 101 may be a lower right part with respect to the content display direction.

For example, the electronic device 101 may identify a right edge area of the flexible display with respect to the basic display direction 801 of the UI screen as the edge area to be slid or a left edge area of the flexible display with respect to the content display direction as the edge area to be slid, and provide the indicator 831 in at least part of an area of the first part corresponding to the identified edge area.

According to various embodiments, the electronic device 101 may further provide a guide object 832 for receiving a second user input related to a sliding direction of the edge area to be slid. For example, the guide object 832 may induce a second user input that is a drag input from right to left.

According to various embodiments, upon receipt of the second user input through the guide object 832, the electronic device 101 may slide the left edge area of the flexible display to the right to expose an extended second part 840 of the flexible display.

According to various embodiments, when second content displayed in the second part 840 is different from or the same as first content displayed in the first part, an area of the first content corresponding to the second part 840 which further includes a left area compared to an area displayed in the first part may be displayed in the second part 840 of the flexible display. According to various embodiments, the electronic device 101 may display an area of the first content corresponding to the second part 840 which further includes a right area displayed in the first part, in the second part 840 of the flexible display.

According to various embodiments, upon receipt of the first user input 830 or the second user input, the electronic device 101 may detect a factor that interferes with the sliding operation. For example, when the guide object 832 is not displayed, upon receipt of the first user input 830, the electronic device may detect the factor that interferes with the sliding operation, and when the guide object 832 is displayed, upon receipt of the second user input, the electronic device may detect the factor that interferes with the sliding operation.

According to various embodiments, upon detection of the factor interfering with the sliding operation, the electronic device 101 may provide a feedback indicating that there is an interference factor. When the interference factor is removed, the electronic device 101 may perform the sliding operation. In another embodiment, when the factor that interferes with the sliding operation is not detected, the electronic device 101 may perform the sliding operation.

According to various embodiments, referring to FIG. 8C, the content display direction may be different from the basic display direction 801 of the UI screen of the electronic device by −90 degrees. According to various embodiments, upon receipt of a first user input 850 for a sliding operation of the flexible display (e.g., the display module 160 of FIG. 1) in a state in which a first part of the flexible display is exposed (e.g., the closed state), the electronic device 101 (e.g., the electronic device 101 or the processor 120 of FIG. 1) may identify an edge area of the flexible display to be slid, and provide an indicator 851 in at least part of an area of the first part corresponding to the edge area to be slid. For example, an upper left part with respect to the basic display direction 801 of the UI screen of the electronic device 101 may be a lower left part with respect to the content display direction.

For example, the electronic device 101 may identify a right edge area of the flexible display with respect to the basic display direction 801 of the UI screen as the edge area to be slid or an upper edge area of the flexible display with respect to the content display direction as the edge area to be slid, and provide the indicator 851 in at least part of an area of the first part corresponding to the identified edge area.

According to various embodiments, the electronic device 101 may further provide a guide object 852 for receiving a second user input related to a sliding direction of the edge area to be slid. For example, the guide object 852 may induce a second user input that is an upward drag input.

According to various embodiments, upon receipt of the second user input through the guide object 852, the electronic device 101 may slide up the upper edge area of the flexible display to expose an extended second part 860 of the flexible display.

According to various embodiments, when second content displayed in the second part 860 are different from or the same as first content displayed in the first part, an area of the first content corresponding to the second part 860 which further includes an upper area compared to an area displayed in the first part may be displayed in the second part 860 of the flexible display. According to various embodiments, the electronic device 101 may display an area of the first content corresponding to the second part 860 which further includes a lower area compared to the area displayed in the first part may be displayed in the second part 860 of the flexible display.

According to various embodiments, upon receipt of the first user input 850 or the second user input, the electronic device 101 may detect a factor that interferes with the sliding operation. For example, when the guide object 852 is not displayed, upon receipt of the first user input 850, the electronic device may detect the factor that interferes with the sliding operation, and when the guide object 852 is displayed, upon receipt of the second user input, the electronic device may detect the factor that interferes with the sliding operation.

According to various embodiments, upon detection of the factor interfering with the sliding operation, the electronic device 101 may provide a feedback indicating that there is an interference factor. When the interference factor is removed, the electronic device 101 may perform the sliding operation. In another embodiment, when the factor that interferes with the sliding operation is not detected, the electronic device 101 may perform the sliding operation.

According to various embodiments, referring to FIG. 8D, the content display direction may be different from the basic display direction 801 of the UI screen of the electronic device by +90 degrees. According to various embodiments, upon receipt of a first user input 870 for a sliding operation of the flexible display (e.g., the display module 160 of FIG. 1) in a state in which a first part of the flexible display is exposed (e.g., the closed state), the electronic device 101 (e.g., the electronic device 101 or the processor 120 of FIG. 1) may identify an edge area of the flexible display to be slid, and provide an indicator 871 in at least part of an area of the first part corresponding to the edge area to be slid. For example, an upper left part with respect to the basic display direction 801 of the UI screen of the electronic device 101 may be an upper right part with respect to the content display direction.

For example, the electronic device 101 may identify a right edge area of the flexible display with respect to the basic display direction 801 of the UI screen as the edge area to be slid or a lower edge area of the flexible display with respect to the content display direction as the edge area to be slid, and provide the indicator 871 in at least part of an area of the first part corresponding to the identified edge area.

According to various embodiments, the electronic device 101 may further provide a guide object 872 for receiving a second user input related to a sliding direction of the edge area to be slid. For example, the guide object 872 may induce a second user input that is a downward drag input.

According to various embodiments, upon receipt of the second user input through the guide object 872, the electronic device 101 may slide down the lower edge area of the flexible display to expose an extended second part 880 of the flexible display.

According to various embodiments, when second content displayed in the second part 880 are different from or the same as first content displayed in the first part, an area of the first content corresponding to the second part 880 which further includes a lower area compared to an area displayed in the first part may be displayed in the second part 880 of the flexible display.

According to various embodiments, upon receipt of the first user input 870 or the second user input, the electronic device 101 may detect a factor that interferes with the sliding operation. For example, when the guide object 872 is not displayed, upon receipt of the first user input 870, the electronic device may detect the factor that interferes with the sliding operation, and when the guide object 872 is displayed, upon receipt of the second user input, the electronic device may detect the factor that interferes with the sliding operation.

According to various embodiments, upon detection of the factor interfering with the sliding operation, the electronic device 101 may provide a feedback indicating that there is an interference factor. When the interference factor is removed, the electronic device 101 may perform the sliding operation. In another embodiment, when the factor that interferes with the sliding operation is not detected, the electronic device 101 may perform the sliding operation.

Although only the slide-out operation of the flexible display is illustrated and described in FIG. 8, the same thing may also be applied to the slide-in operation of the flexible display according to various embodiments.

Figure 9:
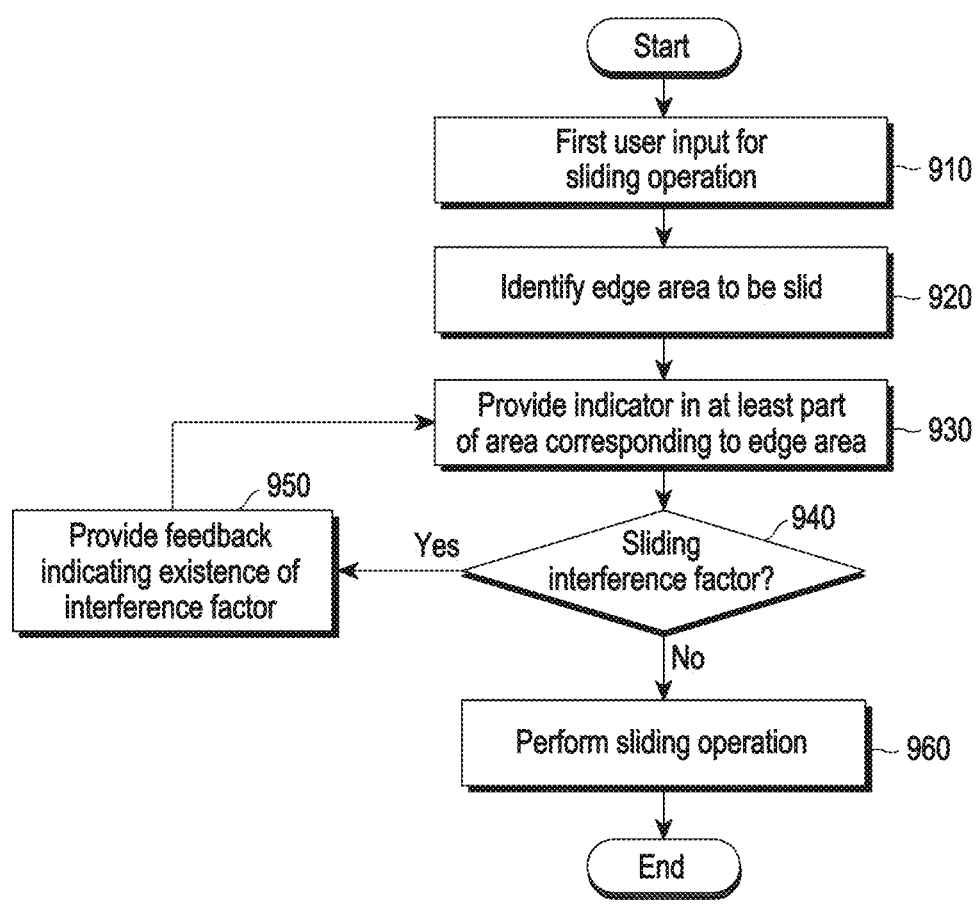
FIG. 9 is a flowchart illustrating an operation of detecting a factor that interferes with a sliding operation of a flexible display according to various embodiments.

FIG. 9 is a flowchart illustrating an operation of detecting a factor that interferes with a sliding operation of a flexible display in an electronic device according to various embodiments.

According to various embodiments, the electronic device 101 (e.g., the electronic device 101 or the processor 120 of FIG. 1) may receive a first user input for a sliding operation of the flexible display (e.g., the display module 160 of FIG. 1) in operation 910.

According to various embodiments, the electronic device 101 may identify an edge area of the flexible display to be slid in operation 920.

Figure 10:
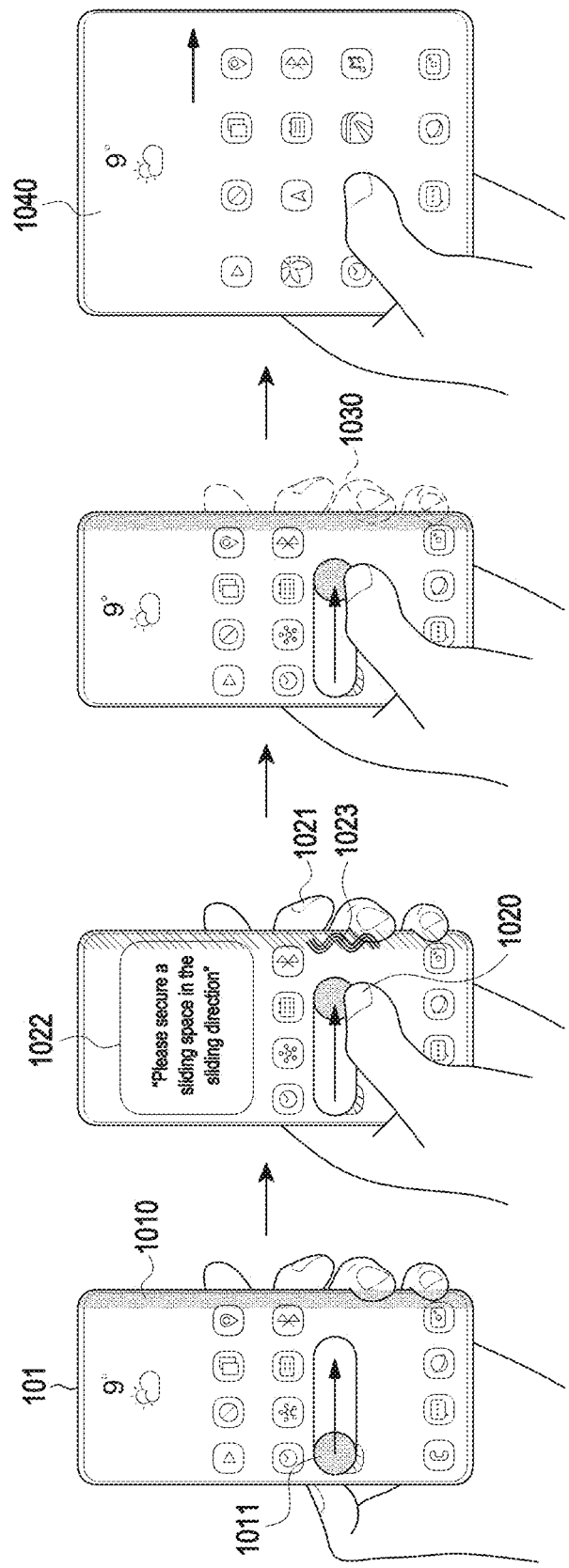
FIG. 10 is a diagram illustrating an operation of detecting a factor that interferes with a sliding operation of a flexible display according to various embodiments.

According to various embodiments, the electronic device 101 may provide (e.g., display) an indicator in at least part of an area corresponding to the edge area in an exposed area of the display in operation 930. According to various embodiments, the electronic device may display a guide object for receiving a second user input related to a sliding direction together with the indicator. For example, as illustrated in FIG. 10, the electronic device 101 may provide an indicator 1010 in the at least part of the area corresponding to the edge area to be slide in the exposed area of the flexible display. In another embodiment, the electronic device 101 may further provide a guide object 1011 for receiving the second user input related to the sliding direction.

According to various embodiments, the electronic device 101 may detect a factor that interferes with sliding in operation 940. For example, upon detection of at least one of a touch pressure in at least a partial area of the flexible display through a touch sensor included in the electronic device or a pressure equal to or greater than a preset value through a pressure sensor, the electronic device 101 may determine that an interference factor has been detected. Alternatively, the electronic device 101 may detect an interference factor through a proximity sensor, and the method of detecting an interference factor is not limited.

According to various embodiments, upon detection at least one of a touch input or a pressure greater than or equal to a preset value in at least part of the edge area of the flexible display to be slid, the electronic device 101 may determine that an interference factor has been detected.

According to various embodiments, the electronic device 101 may identify a gripping shape of the electronic device based on at least one of the number or positions of touch inputs received on the flexible display. For example, when the electronic device 101 is in a horizontal direction, the electronic device 101 may detect at least one of the positions or number of touches in left and right edge areas of the flexible display, and determine that an interference factor for a sliding operation has been detected based on at least one of the detected positions or number of touches. In another embodiment, when the electronic device 101 is in a vertical direction, the electronic device 101 may detect at least one of the positions or number of touches in upper and lower edge areas of the flexible display, and determine that an interference factor for the sliding operation has been detected based on at least one of the detected positions or number of touches.

According to various embodiments, when the flexible display is disposed up to the rear surface of the electronic device 101 (e.g., the electronic device 202 of FIG. 2b), the electronic device 101 determine that an interference factor for the sliding operation has been detected based on at least one of a touch input and a pressure detected on the rear surface of the electronic device 101.

According to various embodiments, when determining that there is a sliding interference factor (operation 940—Yes), the electronic device 101 may provide a feedback indicating that there is a sliding interference factor in operation 950. For example, the electronic device 101 may provide, as a feedback, at least one of vibration, voice, a graphic element, sound, lighting, or message display informing that there is an interference factor.

For example, the electronic device 101 may provide at least one of vibration or lighting as a feedback to an area where the interference factor has been detected. In another embodiment, the electronic device may provide, as a feedback, at least one of a voice such as "Please secure a sliding space in the sliding direction", a sound such as a warning sound, a graphic element, or message display.

For example, as illustrated in FIG. 10, when receiving a second user input 1020 through the guide object, upon detection of a touch input 1021 in at least part of the edge area to be slid, the electronic device 101 may determine that an interference factor has been detected, and provide a vibration feedback 1023 in an area where the touch input 1021 has been sensed or a message display feedback 1022 such as "Please secure a sliding space in the sliding direction". According to various embodiments, the guide object may not be displayed, and upon receipt of the first user input, the electronic device 101 may detect a factor that interferes with the sliding operation.

According to various embodiments, the feedback according to the detection of the interference factor may be set by the user, and a feedback with a different intensity may be provided according to the number of times the interference factor is detected. Various embodiments of providing a feedback will be described below with reference to FIG. 11.

According to various embodiments, after providing the feedback, the electronic device 101 may return to operation 940 to detect a factor that interferes with the sliding operation again.

According to various embodiments, when an interference factor is not detected or removal of the interference factor is detected after the feedback is provided (operation 940-NO), the electronic device 101 may perform the sliding operation in operation 960.

For example, as illustrated in FIG. 10, upon detection of removal 1030 of the interference factor, the electronic device 101 may slides at least part of the flexible display including the edge area to expose a second part 1040 to the outside.

Although only the slide-out operation of the flexible display has been illustrated and described in FIG. 9, the same thing is also applicable to the slide-in operation of the flexible display according to various embodiments. For example, the electronic device 101 may detect a command that causes the flexible display to slide in in an extended state. When the user's hand comes into contact with a sliding area during the sliding operation, the user may miss the electronic device 101 due to contact friction. Accordingly, the electronic device 101 may determine whether an interference factor is located in the sliding area prior to slide-in of the flexible display. The electronic device 101 may be configured to, upon detection of an interference factor, display text such as "Please take your hand off the sliding part", and perform the slide-in operation after identifying removal of the interference factor.

Figure 11:
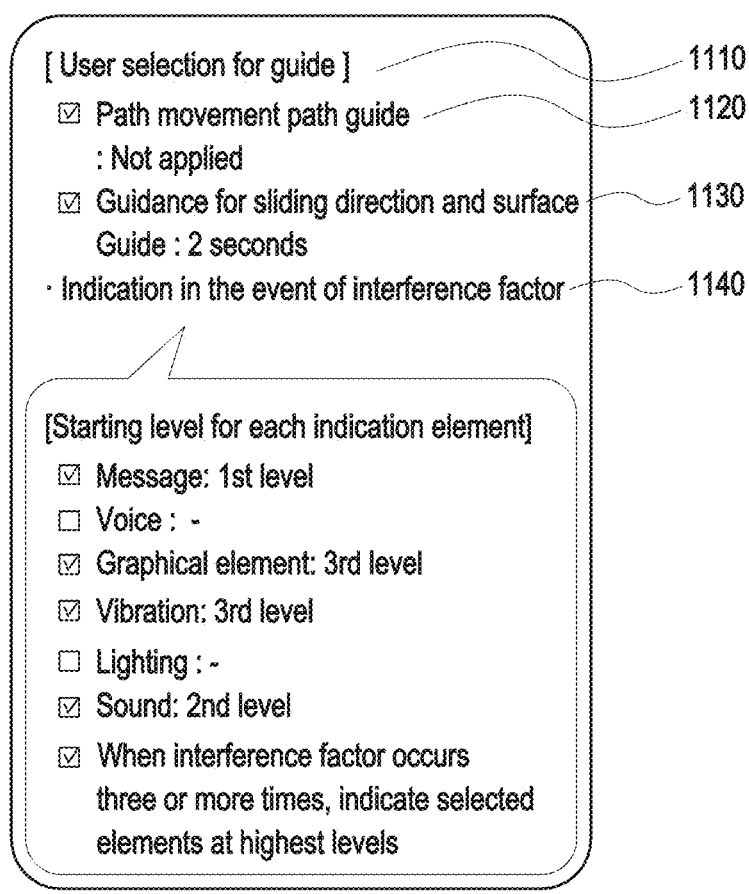
FIG. 11 is a diagram illustrating a UI screen for setting a feedback related to an interference factor according to various embodiments.

FIG. 11 is a diagram illustrating a UI screen for setting a feedback related to an interference factor according to various embodiments.

According to various embodiments, referring to FIG. 11, an electronic device (e.g., the electronic device 101 or the processor 120 of FIG. 1) may display a UI 1110 for setting a feedback through the flexible display (e.g., the display module 160 of FIG. 1).

According to various embodiments, the UI 1110 for setting a feedback may include an area 1120 for setting a guide object display method, an area 1130 for setting an indicator display method, or an area 1140 for setting a feedback when an interference factor occurs.

For example, the electronic device 101 may receive a user setting related to a guide object display method (e.g., always, not applied, or for 2 seconds) through the area 1120 for setting a guide object display method.

In another embodiment, the electronic device 101 may receive a user setting related to an indicator display method (e.g., always, not applied, or for 2 seconds) through the area 1130 for setting an indicator display method.

In another embodiment, the electronic device 101 may receive a user setting related to a feedback type (e.g., message display, voice, graphic element, vibration, lighting, or sound) and a feedback intensity (e.g., the intensity of a feedback according to the number of times an interference factor is detected) through the area 1140 for setting a feedback when an interference factor occurs.

For various embodiments of a feedback type and a feedback intensity which may be set by the user, [Table 1] below will be referred to.

TABLE 1

| Feedback | Interference factor detection | | | Interference factor x | Note |
|---|---|---|---|---|---|
| | First | Second | $N^{th}$ | | |
| Message | Example for extension "Please secure a sliding space in the sliding direction." | Example for extension "Please check again. Please secure a sliding space in the sliding direction." | Use a more intense phrase to make sure the user recognizes. | Not provided, or "Sliding is executed." | In the absence of an interference factor, upon completed recognition of a sliding command, a message indicating execution of sliding may be provided. |
| voice | A voice message is provided. (Example for extension) "Please secure a sliding space in the sliding direction" | A voice message is provided. (Example for extension) "Please check again. Please secure a sliding space in the sliding direction." | Provide a more intense phrase or message by voice to make sure the user recognizes | Not provided, or "Sliding is executed." | In the absence of an interference factor, upon receipt of a user input for sliding, a voice message indicating that sliding is executed may be provided. |
| Graphical element | Color, shape, size, position, and irregular animation effects for warning. (e.g., first-level animation) | More visually vivid color, larger size, more visible position, etc. for warning with higher intensity (e.g., second-level animation) | Much more visually vivid color, much larger size, much more visible position, etc. for warning with much higher intensity (e.g., $N^{th}$-level animation) | Positive color, shape, and position, and stable animation effects | Various representations using graphical elements are available. (e.g., color, shape, position, and animation effects, alone or in combination) |
| Vibration (haptic) | Irregular vibration (e.g., first-level vibration) | Stronger vibration (e.g., second-level vibration) | Increasingly stronger vibration (e.g., $N^{th}$-level vibration) | Stable vibration | |
| lighting | Warning light (e.g., light of first-level brightness) | More intense warning light (e.g., light of second-level brightness) | Increasingly more intense warning light (e.g., light of $N^{th}$-level brightness) | Stable light | |
| sound | Warning sound (e.g., first-level sound volume and warning sound) | More intense warning sound (increasing sound volume) (e.g., second-level sound volume and warning sound) | Increasingly more intense warning sound (increasing sound volume) (e.g., $N^{th}$-level sound volume and warning sound) | Positive sound | |
| Others | Message, voice, graphics, vibration (haptic), sound, etc. may be provided in combination. The number of times and items may be selected for applying the final level, such as "When interference factors occur more than N times, indicate selected elements at highest levels". | | | | |

Figure 12A:
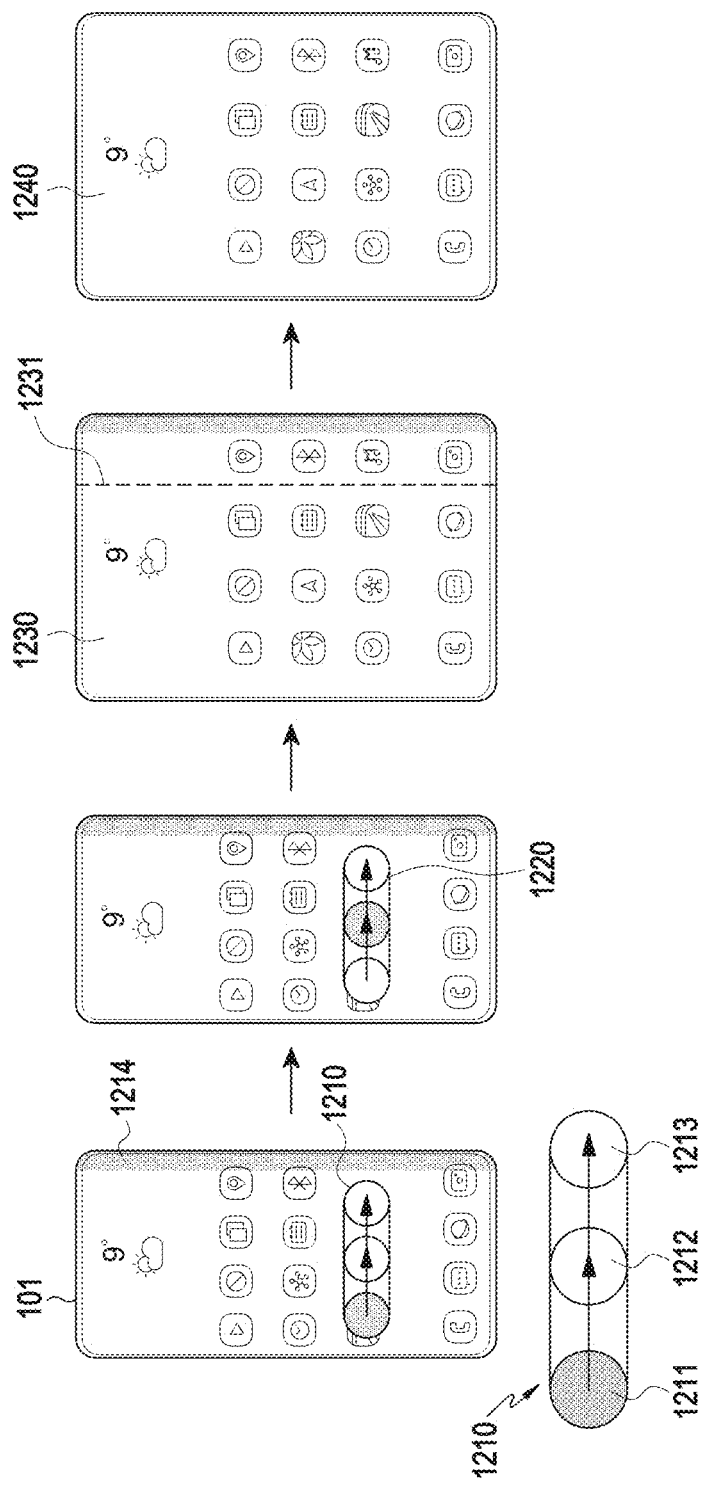
FIG. 12A is a diagram illustrating a stepwise slide-out operation of a flexible display according to various embodiments.

FIG. 12A is a diagram illustrating a stepwise slide-out operation of a flexible display according to various embodiments. According to various embodiments, referring to FIG. 12A, upon receipt of a first user input for a sliding operation in a state in which a first part of the flexible display (e.g., the display module 160 of FIG. 1) is exposed, the electronic device 101 (e.g., the electronic device 101 or the processor 120 of FIG. 1) may identify an edge area of the flexible display to be slid and provide an indicator 1214 in at least part of an area of the first part corresponding to the edge area to be slid.

According to various embodiments, the electronic device 101 may further provide a guide object 1210 for receiving a second user input related to a sliding direction of the edge area to be slid. For example, the guide object 1210 may be a UI for inducing the user's drag input in the sliding direction.

According to various embodiments, the guide object 1210 may include a plurality of objects for a stepwise sliding operation. For example, the guide object 1210 may include a starting point 1211 of a drag input, a first object 1212 related to a first sliding length of the flexible display, and a second object 1213 related to a second sliding length of the flexible display, which is longer than the first sliding length.

According to various embodiments, upon receipt of a drag input 1220 from the starting point 1211 to the first object 1212 through the guide object 1210, the electronic device 101 may expose a second part 1230 of the flexible display by performing a slide-out operation based on the first sliding length.

According to various embodiments, upon receipt of the drag input 1220 from the starting point 1211 to the first object 1212 through the guide object 1210, the electronic device 101 may detect an interference factor in the edge area to be slid. For example, upon detection of an interference factor, the electronic device 101 may provide a feedback, and upon detection of removal of the interference factor, perform the sliding operation.

According to various embodiments, the electronic device 101 may display an object 1231 representing the first part during the slide-out operation of the flexible display, and when a preset time elapses after the sliding operation is completed, display a screen 1240 from which the object 1231 representing the first part has disappeared.

Figure 12B:
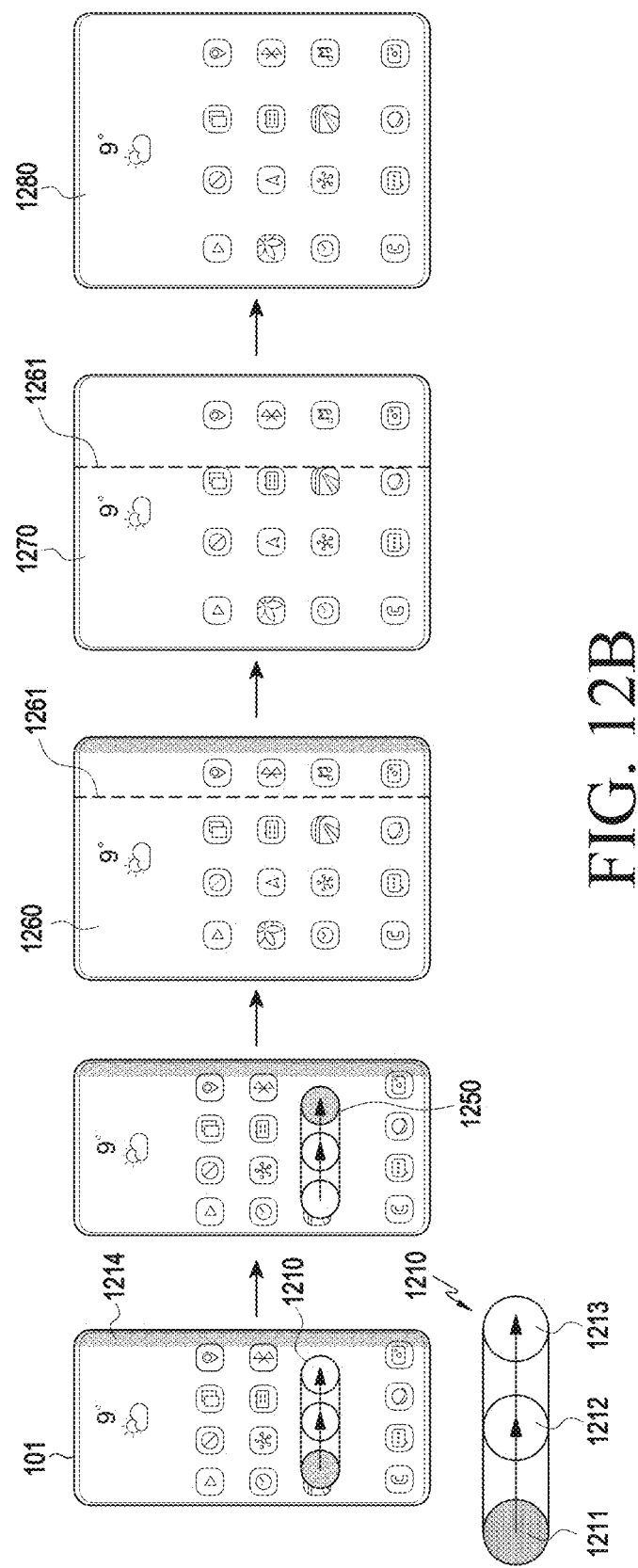
FIG. 12B is a diagram illustrating a stepwise slide-out operation of a flexible display according to various embodiments.

FIG. 12B is a diagram illustrating a stepwise slide-out operation of a flexible display according to various embodiments.

According to various embodiments, referring to FIG. 12B, upon receipt of a first user input for a sliding operation in a state in which a first part of the flexible display (e.g., the display module 160 of FIG. 1) is exposed, the electronic device 101 (e.g., the electronic device 101 or the processor 120 of FIG. 1) may identify an edge area of the flexible display to be slid and provide the indicator 1214 in at least part of an area of the first part corresponding to the edge area to be slid.

According to various embodiments, the electronic device 101 may provide the same guide object 1210 as illustrated in FIG. 11*a*.

According to various embodiments, upon receipt of a drag input 1250 from the starting point 1211 to the second object 1213 through the guide object 1210, the electronic device 101 may perform a slide-out operation based on the second sliding length. For example, after exposing a part 1260 of the flexible display corresponding to the first sliding length by the slide-out operation, the electronic device 101 may expose a second part 1270 of the flexible display corresponding to the second sliding length by continuing the slide-out operation.

According to various embodiments, upon receipt of the drag input 1250 from the starting point 1211 to the second object 1213 through the guide object 1210, the electronic device 101 may detect an interference factor in the edge area to be slid. For example, upon detection of an interference factor, the electronic device 101 may provide a feedback, and upon detection of removal of the interference factor, perform the sliding operation.

According to various embodiments, the electronic device 101 may display an object 1261 representing the first part during the slide-out operation of the flexible display. For example, the electronic device 101 may display the object 1261 representing the first part in the part 1260 of the flexible display corresponding to the first sliding length and the second part 1270 of the flexible display corresponding to the second sliding length. When a preset time elapses after the sliding operation is completed, the electronic device 101 may display a screen 1280 from which the object 1261 representing the first object has disappeared.

Figure 13A:
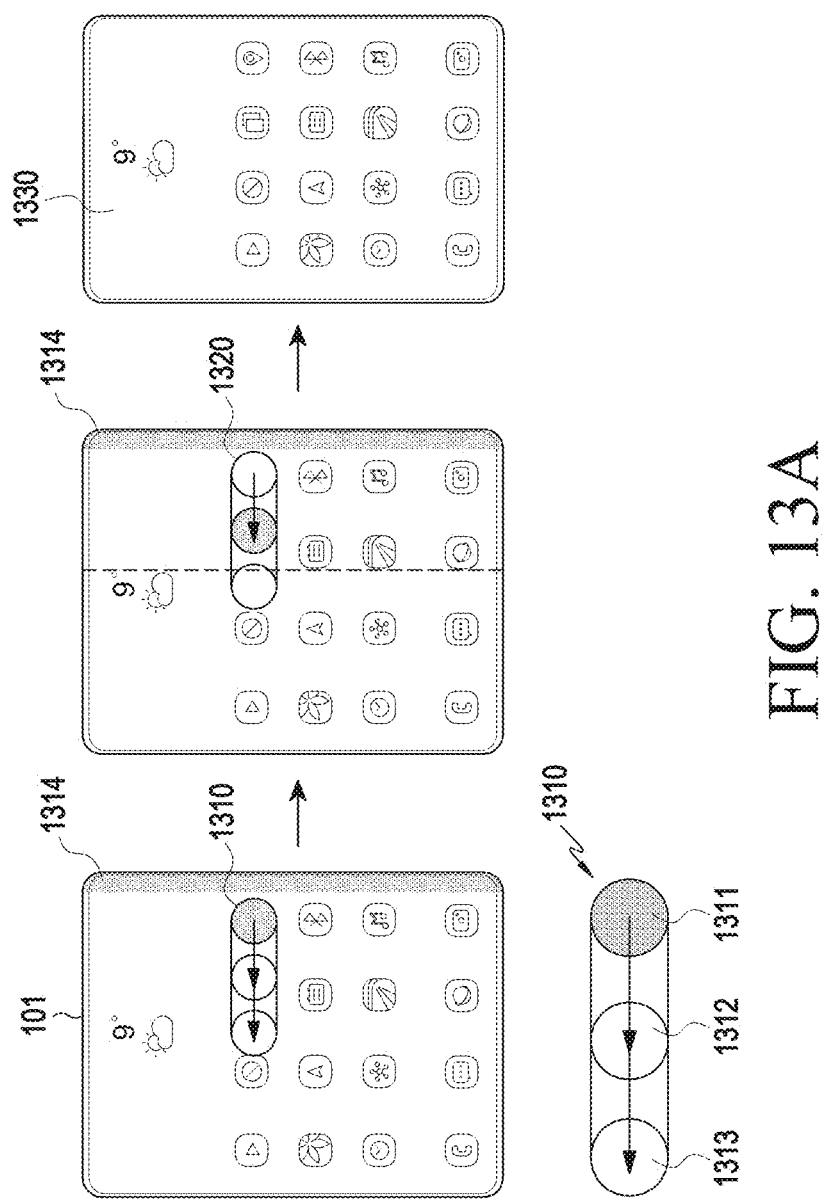
FIG. 13A is a diagram illustrating a stepwise slide-in operation of a flexible display according to various embodiments.

FIG. 13A is a diagram illustrating a stepwise slide-in operation of a flexible display according to various embodiments.

Figure 13B:
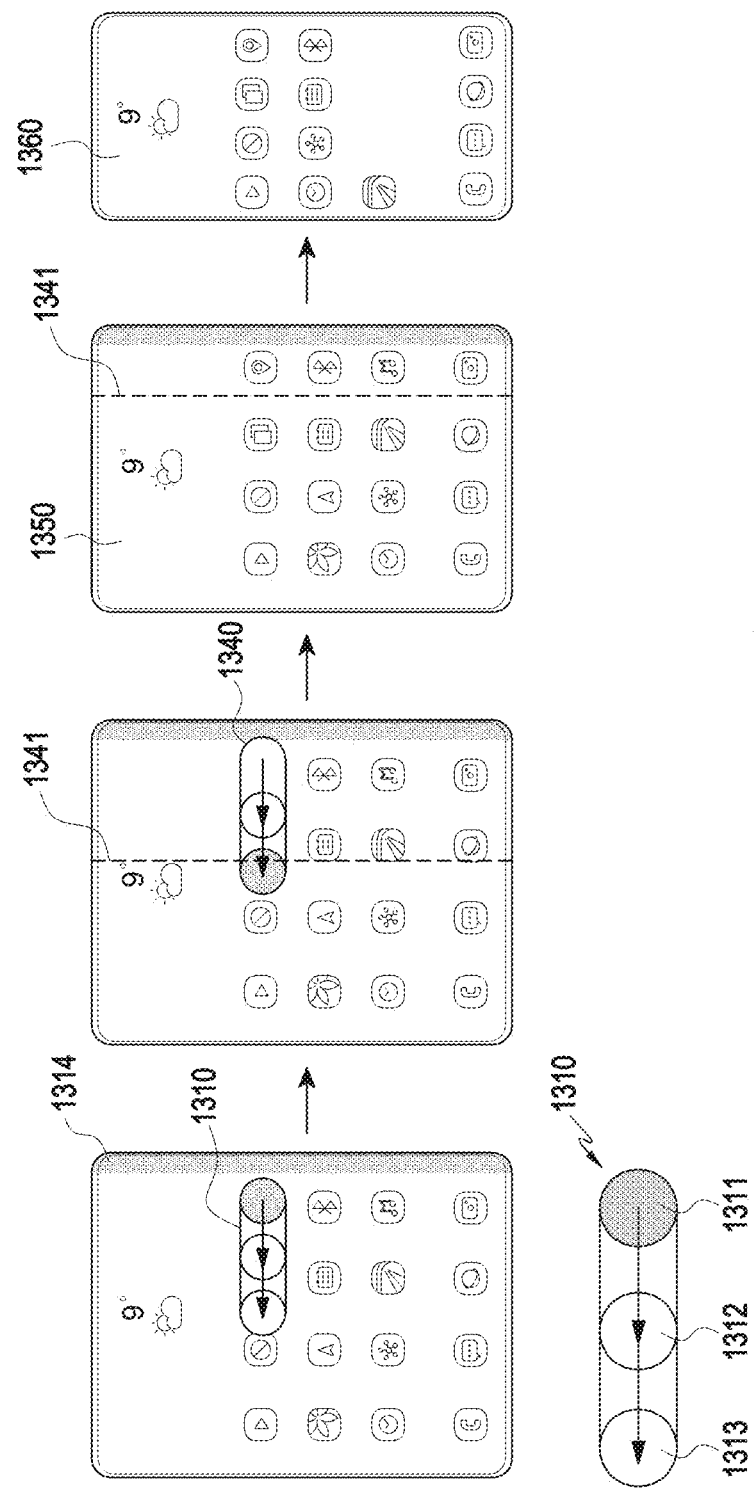
FIG. 13B is a diagram illustrating a stepwise slide-in operation of a flexible display according to various embodiments.

According to various embodiments, referring to FIG. 13B, upon receipt of a first user input for a sliding operation in a state in which a first part of the flexible display (e.g., the display module 160 of FIG. 1) is exposed, the electronic device 101 (e.g., the electronic device 101 or the processor 120 of FIG. 1) may identify an edge area of the flexible display to be slid and provide an indicator 1314 in at least part of an area of the first part corresponding to the edge area to be slid.

According to various embodiments, the electronic device 101 may further provide a guide object 1310 for receiving a second user input related to a sliding direction of the edge area to be slid. For example, the guide object 1310 may be a UI for inducing the user's drag input in the sliding direction.

According to various embodiments, the guide object 1310 may include a plurality of objects for a stepwise sliding operation. For example, the guide object 1210 may include a starting point 1311 of a drag input, a first object 1312 related to a first sliding length of the flexible display, and a second object 1313 related to a second sliding length of the flexible display, which is longer than the first sliding length.

According to various embodiments, upon receipt of a drag input 1320 from the starting point 1311 to the first object 1312 through the guide object 1310, the electronic device 101 may expose a second part 1330 of the flexible display by performing a slide-in operation based on the first sliding length.

According to various embodiments, upon receipt of the drag input 1320 from the starting point 1311 to the first object 1312 through the guide object 1310, the electronic device 101 may detect an interference factor in the edge area to be slid. For example, upon detection of an interference factor, the electronic device 101 may provide a feedback, and upon detection of removal of the interference factor, perform the sliding operation.

According to various embodiments, the electronic device 101 may display an object 1321 representing the second part during the slide-in operation of the flexible display, and when a preset time elapses after the sliding operation is completed, display a screen 1330 from which the object 1321 representing the first part has disappeared.

FIG. 13B is a diagram illustrating a stepwise slide-in operation of a flexible display according to various embodiments.

According to various embodiments, referring to FIG. 13B, upon receipt of a first user input for a sliding operation in a state in which a first part of the flexible display (e.g., the display module 160 of FIG. 1) is exposed, the electronic device 101 (e.g., the electronic device 101 or the processor 120 of FIG. 1) may identify an edge area of the flexible display to be slid and provide the indicator 1314 in at least part of an area of the first part corresponding to the edge area to be slid.

According to various embodiments, the electronic device 101 may provide the same guide object 1310 as illustrated in FIG. 12A.

According to various embodiments, upon receipt of a drag input 1340 from the starting point 1311 to the second object 1313 through the guide object 1310, the electronic device 101 may perform a slide-in operation based on the second sliding length. For example, after exposing a part 1350 of the flexible display corresponding to the first sliding length by the slide-in operation, the electronic device 101 may expose a second part 1360 of the flexible display corresponding to the second sliding length by continuing the slide-in operation.

According to various embodiments, upon receipt of the drag input from the starting point 1311 to the second object 1313 through the guide object 1310, the electronic device 101 may detect an interference factor in the edge area to be slid. For example, upon detection of an interference factor, the electronic device 101 may provide a feedback, and upon detection of removal of the interference factor, perform the sliding operation.

According to various embodiments, the electronic device 101 may display an object 1341 representing the second part during the slide-in operation of the flexible display. For example, the electronic device 101 may display the object 1261 representing the second part of a part 1350 of the flexible display corresponding to the first sliding length, immediately before or simultaneously with the start of the slide-in operation, and display a screen 1360 from which the object 1341 representing the second object has disappeared after completion of the sliding operation.

Figure 14:
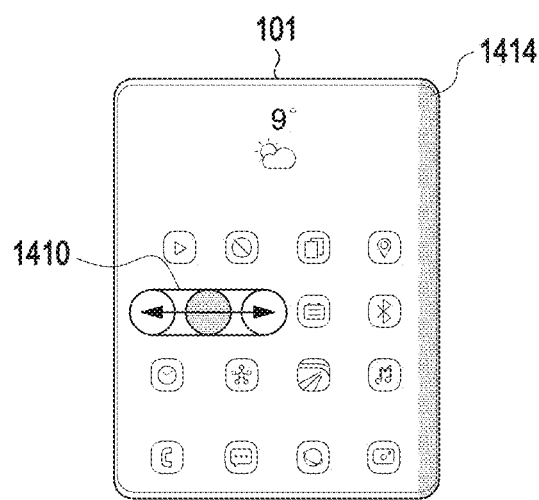
FIG. 14 is a diagram illustrating a stepwise sliding operation of a flexible display according to various embodiments.
Figure 14:
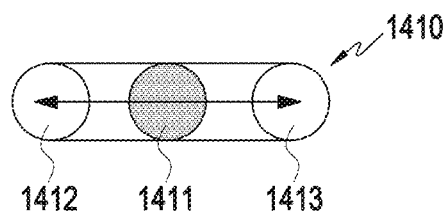

FIG. 14 is a diagram illustrating a stepwise sliding operation of a flexible display according to various embodiments. For example, FIG. 14 illustrates an embodiment in which a first user input for a sliding operation is received in a state in which a sliding operation is completely performed based on a first sliding length.

According to various embodiments, referring to FIG. 14, upon receipt of a first user input for a sliding operation in a state in which a sliding operation of the flexible display (e.g., the display module 160 of FIG. 1) is completed based on a first sliding length, the electronic device 101 (e.g., the electronic device 101 or the processor 120 of FIG. 1) may identify an edge area of the flexible display to be slid and provide an indicator 1414 in at least part of an area of the first part corresponding to the edge area to be slid.

According to various embodiments, the electronic device 101 may further provide a guide object 1410 for receiving a second user input related to a sliding direction of the edge area to be slid. For example, the guide object 1410 may be a UI for inducing the user's drag input in the sliding direction.

According to various embodiments, the guide object 1410 may include a plurality of objects for a stepwise sliding operation. For example, the guide object 1410 may include a starting point 1411 of a drag input, a first object 1412 related to a slide-in operation of the flexible display, and a second object 1413 related to a slide-out operation of the flexible display.

According to various embodiments, upon receipt of a drag input from the starting point 1411 to the first object 1412 through the guide object 1410, the electronic device 101 may perform the slide-in operation of the flexible display.

According to various embodiments, upon receipt of a drag input from the starting point 1411 to the second object 1413 through the guide object 1410, the electronic device 101 may perform the slide-out operation of the flexible display.

According to various embodiments, upon receipt of a drag input through the guide object 1410, the electronic device may detect an interference factor in the edge area to be slid. For example, upon detection of an interference factor, the electronic device 101 may provide a feedback, and upon detection of removal of the interference factor, perform a sliding operation.

Figure 15:
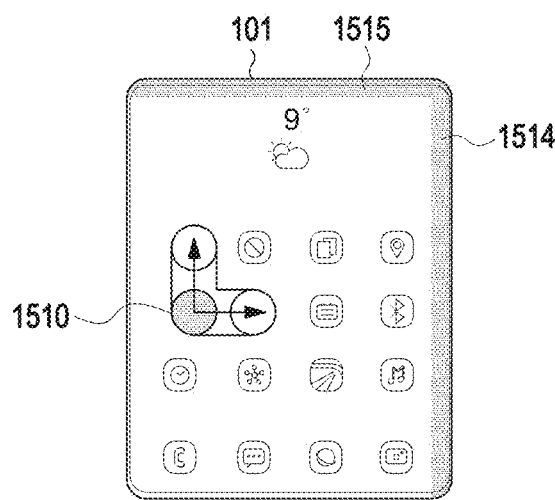
FIG. 15 is a diagram illustrating a multi-directional sliding operation of a flexible display according to various embodiments.
Figure 15:
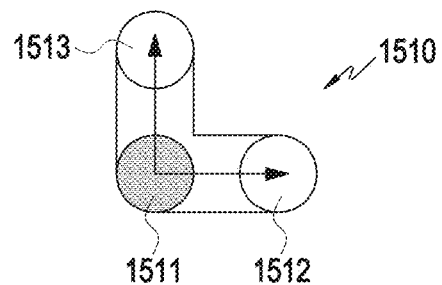

FIG. 15 is a diagram illustrating a multi-directional sliding operation of a flexible display according to various embodiments. For example, while sliding operations are available for an upper edge area and a right edge area with respect to the basic display direction of the UI screen of the electronic device 101 in FIG. 15, the positions and number of slidable edge areas are not limited to FIG. 15.

According to various embodiments, referring to FIG. 15, upon receipt of a first user input for a sliding operation of the flexible display (e.g., the display module 160 of FIG. 1), the electronic device 101 (e.g., the electronic device 101 or the processor 120 of FIG. 1) may identify an edge area of the flexible display to be slid, and provide an indicator in at least part of an area of a first part exposed on the flexible display, corresponding to the edge area to be slid. For example, the electronic device 101 may provide a first indicator 1514 in an area of the first part corresponding to the right edge area to be slid and a second indicator 1515 in an area of the first part corresponding to the upper edge area to be slid.

According to various embodiments, the electronic device 101 may further provide a guide object 1510 for receiving a second user input related to a sliding direction of an edge area to be slid. For example, the guide object 1510 may be a UI for inducing the user's drag input in the sliding direction.

According to various embodiments, the guide object 1510 may include a plurality of objects for a stepwise sliding operation. For example, the guide object 1510 may include a starting point 1511 of a drag input, a first object 1512 related to a sliding operation of the flexible display in a first direction, and a second object 1513 related to a sliding operation of the flexible display in a second direction. According to various embodiments, the guide object 1510 may further include a third object in an upper right direction between the first object 1512 and the second object 1513.

According to various embodiments, upon receipt of a drag input from the starting point 1511 to the first object 1512 through the guide object 1510, the electronic device 101 may slide the flexible display in the first direction.

According to various embodiments, upon receipt of a drag input from the starting point 1511 to the second object 1513 through the guide object 1510, the electronic device 101 may slide the flexible display in the second direction.

According to various embodiments, upon receipt of a drag input from the starting point 1511 to the third object through the guide object 1510, the electronic device 101 may slide the flexible display in the first direction and the second direction.

According to various embodiments, upon receipt of a drag input through the guide object 1510, the electronic device may detect an interference factor in the edge area to be slid. For example, upon detection of an interference factor, the electronic device 101 may provide a feedback, and upon detection of removal of the interference factor, perform a sliding operation.

Figure 16:
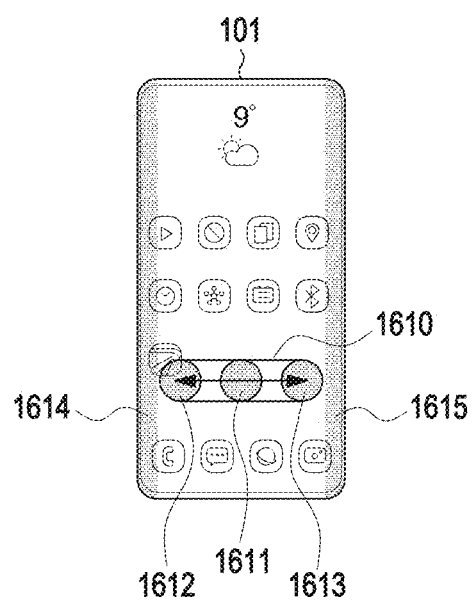
FIG. 16 is a diagram illustrating a multi-directional sliding operation of a flexible display according to various embodiments.

FIG. 16 is a diagram illustrating a multi-directional sliding operation of a flexible display according to various embodiments. For example, while sliding operations are available in both directions (e.g., a left edge area and a right edge area) with respect to the basic display direction of the UI screen of the electronic device 101 in FIG. 16, the positions and number of slidable edge areas are not limited to FIG. 16.

According to various embodiments, referring to FIG. 16, upon receipt of a first user input for a sliding operation of the flexible display (e.g., the display module 160 of FIG. 1), the electronic device 101 (e.g., the electronic device 101 or the processor 120 of FIG. 1) may identify an edge area of the flexible display to be slid, and provide an indicator in at least part of an area of a first part exposed on the flexible display, corresponding to the edge area to be slid. For example, the electronic device 101 may provide a first indicator 1614 in an area of the first part corresponding to the left edge area to be slid and a second indicator 1615 in an area of the first part corresponding to the right edge area to be slid.

According to various embodiments, the electronic device 101 may further provide a guide object 1610 for receiving a second user input related to a sliding direction of an edge area to be slid. For example, the guide object 1610 may be a UI for inducing the user's drag input in the sliding direction.

According to various embodiments, the guide object 1610 may include a plurality of objects for a stepwise sliding operation. For example, the guide object 1610 may include a starting point 1611 of a drag input, a first object 1612 related to a sliding operation of the flexible display in a first direction, and a second object 1613 related to a sliding operation of the flexible display in a second direction.

According to various embodiments, upon receipt of a drag input from the starting point 1611 to the first object 1612 through the guide object 1610, the electronic device 101 may slide the flexible display in the first direction.

According to various embodiments, upon receipt of a drag input from the starting point 1611 to the second object 1613 through the guide object 1610, the electronic device 101 may slide the flexible display in the second direction.

According to various embodiments, upon receipt of a drag input through the guide object 1610, the electronic device may detect an interference factor in the edge area to be slid. For example, upon detection of an interference factor, the electronic device 101 may provide a feedback, and upon detection of removal of the interference factor, perform a sliding operation.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a housing;
   a flexible display at least partially exposed to an outside through the housing;
   a processor; and
   memory storing instructions that, when executed by the processor, cause the electronic device to:
   receive a first user input on the flexible display, in a state in which a first part of the flexible display is exposed to the outside, for a sliding operation to further expose a second part of the flexible display to the outside, based on the first user input, control the flexible display to display a guide object for receiving a second user input related to a sliding direction of an edge area, and display an indicator indicating the edge area of the flexible display where the sliding operation is performed, in at least part of an area of the first part of the flexible display, corresponding to the edge area of the flexible display, and expose the second part of the flexible display to the outside by sliding at least part of the flexible display including the edge area.

2. The electronic device of claim 1, wherein the edge area is an end area of the flexible display which moves in an outward direction from the housing based on the sliding operation, and wherein the instructions, when executed by the processor, cause the electronic device to:

based on receiving the second user input through the guide object, expose the second part of the flexible display to the outside by sliding the at least part of the flexible display including the edge area according to the sliding direction.

3. The electronic device of claim 2, wherein the guide object includes a first object related to a first sliding length of the flexible display, and a second object related to a second sliding length of the flexible display, the second sliding length being greater than the first sliding length, and wherein the instructions, when executed by the processor, cause the electronic device to slide the at least part of the flexible display including the edge area based on a sliding length related to an object selected by the second user input from among the first object and the second object.

4. The electronic device of claim 1, wherein the instructions, when executed by the processor, cause the electronic device to:

detect an interference factor interfering with the sliding operation, based on a detection of the interference factor, provide a first feedback indicating that the interference factor exists, and expose the second part of the flexible display to the outside by sliding the at least part of the flexible display including the edge area based on detecting that the interference factor is removed.

5. The electronic device of claim 4, wherein the first feedback includes at least one of vibration, sound, lighting, or message display.

6. The electronic device of claim 4, wherein the instructions, when executed by the processor, cause the electronic device to, based on not detecting the interference factor being removed for a predetermined time after the first feedback is provided, provide a second feedback with a greater intensity than the first feedback.

7. The electronic device of claim 4, wherein the first feedback is set by a user input.

8. The electronic device of claim 1, wherein the instructions, when executed by the processor, cause the electronic device to, based on detecting at least one of a touch input or a pressure greater than or equal to a predetermined value in at least part of the edge area, determine that an interference factor is detected.

9. The electronic device of claim 1, wherein the instructions, when executed by the processor, cause the electronic device to, based on receiving the first user input on the flexible display in a state in which a lock screen is displayed on the first part of the flexible display, display an unlock screen on the second part of the flexible display after the sliding operation.

10. The electronic device of claim 1, wherein the instructions, when executed by the processor, cause the electronic device to:

expose the second part of the flexible display to the outside by sliding the at least part of the flexible display including the edge area in a first direction, based on receiving a third user input on the flexible display, in a state in which the second part of the flexible display is exposed to the outside, for the sliding operation to expose the first part of the flexible display to the outside, wherein the first part of the flexible display is a portion of the second part of the flexible display, control the flexible display to display a second indicator, in at least part of the area of the first part of the flexible display, corresponding to the edge area of the flexible display, and expose the first part of the flexible display to the outside by sliding the at least part of the flexible display including the edge area in a second directions which is opposite to the first direction.

11. A method of controlling an electronic device, the method comprising:

receiving a first user input on a flexible display of the electronic device, in a state in which a first part of the flexible display is exposed to the outside, for a sliding operation to further expose a second part of the flexible display to the outside;

based on the first user input, displaying a guide object for receiving a second user input related to a sliding direction of an edge area, and displaying an indicator indicating the edge area of the flexible display where the sliding operation is performed, in at least part of an area of the first part of the flexible, display corresponding to the edge area of the flexible display; and exposing the second part of the flexible display to the outside by sliding at least part of the flexible display including the edge area.

12. The method of claim 11, wherein the edge area is an end area of the flexible display which moves in an outward direction from a housing based on the sliding operation, and wherein the exposing the second part of the flexible display to the outside comprises, based on receiving the second user input through the guide object, exposes the second part of the flexible display to the outside by sliding the at least part of the flexible display including the edge area according to the sliding direction.

13. The method of claim 12, wherein the guide object includes a first object related to a first sliding length of the flexible display, and a second object related to a second sliding length of the flexible display, the second sliding length being greater than the first sliding length, and wherein the exposing the second part of the flexible display to the outside comprises sliding the at least part of the flexible display including the edge area based on a sliding length related to an object selected by the second user input from among the first object and the second object.

14. The method of claim 11, further comprising:

detecting an interference factor interfering with the sliding operation, based on a detection of the interference factor, providing a first feedback indicating that the interference factor exists, and exposing the second part of the flexible display to the outside by sliding the at least part of the flexible display including the edge area based on detecting that the interference factor is removed.

15. The method of claim 14, wherein the first feedback includes at least one of vibration, sound, lighting, or message display.

16. The method of claim 14, further comprising, based on not detecting the interference factor being removed for a predetermined time after the first feedback is provided, providing a second feedback with a greater intensity than the first feedback.

17. The method of claim 11, further comprising detecting an interference factor based on detecting at least one of a touch input or a pressure greater than or equal to a predetermined value in at least part of the edge area.

18. The method of claim 11, wherein the receiving the first user input comprises, receiving the first user input on the flexible display in a state in which a lock screen is displayed on the first part of the flexible display, and wherein the method further comprises, displaying an unlock screen on the second part of the flexible display after the sliding operation.

19. The method of claim 11, wherein the exposing the second part of the flexible display to the outside comprises, exposing the second part of the flexible display to the outside by sliding at least part of the flexible display including the edge area in a first direction, and wherein the method further comprises:

receiving a third user input on the flexible display, in a state in which the second part of the flexible display is exposed to the outside, for the sliding operation to expose the first part of the flexible display to the outside, wherein the first part of the flexible display is a portion of the second part of the flexible display, displaying a second indicator, in at least part of the area of the first part of the flexible display, corresponding to the edge area of the flexible display, and exposing the first part of the flexible display to the outside by sliding the at least part of the flexible display including the edge area in a second directions which is opposite to the first direction.

20. One or more non-transitory computer-readable storage media storing instructions that, when executed by one or more processors of an electronic device, cause the electronic device to perform operations, the operations comprising:

receiving a first user input on a flexible display of the electronic device, in a state in which a first part of the flexible display is exposed to the outside, for a sliding operation to further expose a second part of the flexible display to the outside;

based on the first user input, displaying a guide object for receiving a second user input related to a sliding direction of an edge area, and displaying an indicator indicating the edge area of the flexible display where the sliding operation is performed, in at least part of an area of the first part of the flexible, display corresponding to the edge area of the flexible display; and exposing the second part of the flexible display to the outside by sliding at least part of the flexible display including the edge area.

* * * * *